US006615293B1

(12) United States Patent
Shima et al.

(10) Patent No.: US 6,615,293 B1
(45) Date of Patent: Sep. 2, 2003

(54) METHOD AND SYSTEM FOR PROVIDING AN EXACT IMAGE TRANSFER AND A ROOT PANEL LIST WITHIN THE PANEL SUBUNIT GRAPHICAL USER INTERFACE MECHANISM

(75) Inventors: Hisato Shima, Tokyo (JP); Atsushi Suzuki, San Diego, CA (US); Takuya Nishimura, Kanagawa-ken (JP)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 421 days.

(21) Appl. No.: 09/585,883

(22) Filed: May 31, 2000

Related U.S. Application Data

(63) Continuation-in-part of application No. 09/108,265, filed on Jul. 1, 1998, now Pat. No. 6,148,241.
(60) Provisional application No. 60/145,627, filed on Jul. 26, 1999.

(51) Int. Cl.[7] .................................................. G06F 3/00
(52) U.S. Cl. ................................ 710/30; 710/15; 713/1; 709/236; 345/327
(58) Field of Search ........................ 710/1, 15, 17–19, 710/29, 30, 36, 52; 713/11; 715/100; 709/201, 236, 237, 238, 242; 345/517, 327; 700/19, 83

(56) References Cited

U.S. PATENT DOCUMENTS

| | | | | |
|---|---|---|---|---|
| 5,517,257 | A | | 5/1996 | Dunn et al. .................. 348/734 |
| 5,606,664 | A | | 2/1997 | Brown et al. .......... 375/200.01 |
| 5,666,498 | A | * | 9/1997 | Amro .......................... 345/342 |
| 5,721,849 | A | * | 2/1998 | Amro .......................... 395/340 |
| 5,734,363 | A | * | 3/1998 | Blouin et al. .................. 345/89 |
| 5,956,025 | A | * | 9/1999 | Coulden et al. ............. 345/327 |
| 5,956,049 | A | * | 9/1999 | Cheng ......................... 345/517 |
| 6,295,479 | B1 | * | 9/2001 | Shima et al. .................. 700/83 |
| 6,449,514 | B1 | * | 9/2002 | Natsubori et al. ............ 700/19 |

FOREIGN PATENT DOCUMENTS

| | | | |
|---|---|---|---|
| EP | 0 596 594 A1 | 5/1994 | ........... G06K/11/18 |
| EP | 0 745 929 A1 | 12/1996 | ............. G06F/3/12 |
| WO | WO 96/14618 | 5/1996 | ............. G06F/9/44 |

* cited by examiner

Primary Examiner—Jeffrey Gaffin
Assistant Examiner—Rijue Mai
(74) Attorney, Agent, or Firm—Wagner, Murabito, Hao LLP

(57) ABSTRACT

A method and system for providing an exact image transfer and root panel list within the panel subunit graphical user interface mechanism of networked electronic devices. The exact image transfer mechanism allows a target device to send a networked controller device a bitmap image of the exact display required of the target device. By transferring an exact bitmap of what is to be displayed, the target device can guarantee that the display rendered by the controller will not be modified or altered. This is useful in cases where the display represents an electronic program guide (EPG) or other suitable display that should be displayed with a predetermined arrangement and should not be altered by the controller. This is also useful in cases where the controller does not have a robust processing capability and therefore merely displays the exact bitmap sent by the target. Focus navigation is communicated from the controller to the target which then can alter the bitmap to illustrate an updated focus. Command pass-through can be used to communicate the focus navigation commands to the target. A root panel list maintained by the target can also be used to inform the controller of the capabilities of the target. The entries of the root panel list can be bitmap type, element type or analog video type. A controller can more readily generate the root panel without requiring more information from the target device and without having to render the entire panel subunit descriptor information for instances when a controller having a reduced processing set is used.

16 Claims, 33 Drawing Sheets

12

382

| CONTROL TYPE = LCD PANEL |
| --- |
| 440 |

CONTROL IMAGE =    — 442a

442

| CONTROL SIZE (IN X AND Y DIMENSIONS) |
| --- |
| 444 |

| GROUP IDENTIFICATION |
| --- |
| 446 |

CONTROL POSITION IN GROUP :     448b / 448a

448

| VALUE RANGE SPECIFICATION: <CHARACTER AND ICON SET(S) SUPPORTED BY THIS DISPLAY> |
| --- |
| 450 |

| AV/C COMMAND = FF  (NO COMMAND) |
| --- |
| 452 |

| TARGET SUBUNIT = FF  (NO SUBUNIT) |
| --- |
| 454 |

| NAME = NIL |
| --- |
| 456 |

| HELP STRING = NIL |
| --- |
| 458 |

384

| CONTROL TYPE = BUTTON |
| --- |
| 460 |

CONTROL IMAGES =
  PRESSED = ◸  — 462a
  RELEASED = ◺  — 462b
                                    462

| CONTROL SIZE (IN X AND Y DIMENSIONS) |
| --- |
| 464 |

| GROUP IDENTIFICATION |
| --- |
| 466 |

CONTROL POSITION IN GROUP :  — 468b
[ ] [ ] [468a] [ ] [ ]
                                    468

| VALUE RANGE SPECIFICATION: |
| --- |
| <INTEGER, 0, 1> |
| 470 |

| AV/C COMMAND = |
| --- |
| $C3_{16}$ (PLAY)     472 |

| TARGET SUBUNIT = |
| --- |
| (VCR SUBUNIT TYPE AND ID) |
| 474 |

| NAME = "PLAY" |
| --- |
| 476 |

| HELP STRING = NIL |
| --- |
| 478 |

FIGURE 7B

| | | |
|---|---|---|
| A&E | LAW & ORDER | HIGHLANDER > |
| TNT | WCW WRESTLING | THE JERK > |
| TBS | <u>876</u> *NAT'L GEO EXPLORER* | AMERICAN... > |
| CNN | LARRY KING / SPORTS | CROSSFIRE > |
| HBO | TOMMY BOY | MAJOR... > |

| | | |
|---|---|---|
| A&E ← 880 | LAW & ORDER | HIGHLANDER > |
| TNT | *WCW WRESTLING* 882 | THE JERK > |
| TBS | NATL GEO EXPLORER | AMERICAN... > |
| CNN | LARRY KING \| SPORTS | CROSSFIRE > |
| HBO | TOMMY BOY | MAJOR... > |

FIGURE 16B

| | | |
|---|---|---|
| A&E | LAW & ORDER | HIGHLANDER | > |
| TNT | WCW WRESTLING | *THE JERK* | > |
| | | 886 | |
| TBS | NATL GEO EXPLORER | AMERICAN... | > |
| CNN | LARRY KING | SPORTS | CROSSFIRE | > |
| | TOMMY BOY | | |
| HBO | | MAJOR... | > |

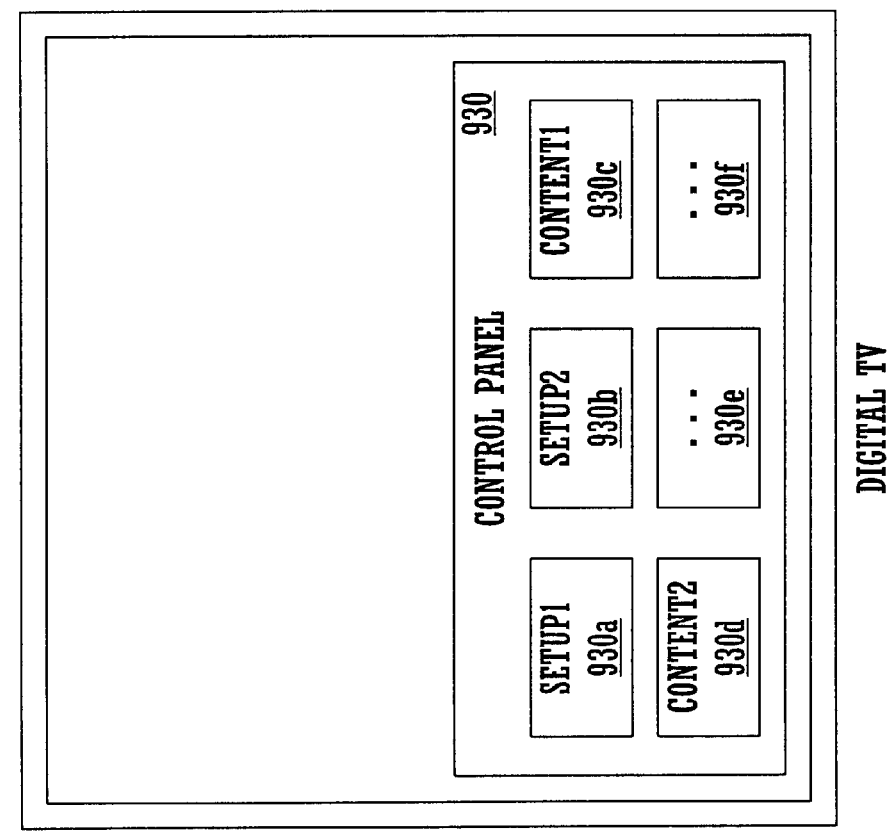
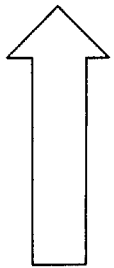
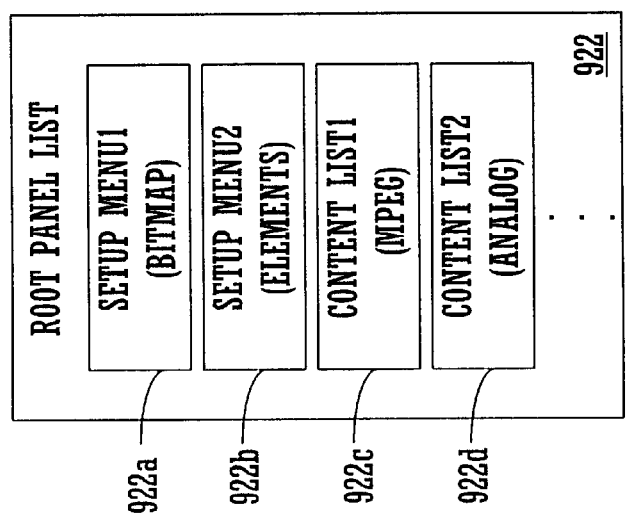
FIGURE 19B
FIGURE 19A

| DECIMATED VIDEO SPECIFIC STRUCTURE | |
|---|---|
| START POSITION (x) | 952a |
| START POSITION (y) | 952b |
| SIZE (WIDTH) | 952c |
| SIZE (HEIGHT) | 952d |
| CHANNEL NUMBER (FOR VIDEO) | 952e |

```
ENTER
  │
  ▼
┌─────────────────────────────────────────────────────────┐
│ TARGET AND CONTROLLER ARE CONNECTED TOGETHER WITHIN AN  │
│                  ELECTRONIC NETWORK                     │
│                          982                            │
└─────────────────────────────────────────────────────────┘
  │
  ▼
┌─────────────────────────────────────────────────────────┐
│  CONTROLLER READS THE ROOT PANEL LIST FROM TARGET AND   │
│ RECOGNIZES THE OPTION TAKEN FOR EACH PANEL ENTRY (E.G., │
│ COMMAND PASS THRU WITH IMAGE TRANSFER, COMMAND PASS     │
│                      THRU, ETC.)                        │
│                          984                            │
└─────────────────────────────────────────────────────────┘
  │
  ▼
┌─────────────────────────────────────────────────────────┐
│  CONTROLLER ALSO CHECKS THE PANEL SUBUNIT DESCRIPTOR TO │
│       DETERMINE THE TYPE OF PANEL FOR THE TARGET        │
│                          986                            │
└─────────────────────────────────────────────────────────┘
  │
  ▼
┌─────────────────────────────────────────────────────────┐
│ IN RESPONSE TO USER INPUT (E.G., PRESSES "CONTROL       │
│ PANEL" BUTTON), CONTROLLER GENERATES THE ROOT PANEL     │
│ DISPLAY ITSELF WITHOUT ANY REQUIRED COMMUNICATION WITH  │
│ TARGET AND CONTROLLER RENDERS THE ROOT PANEL DISPLAY    │
│                          988                            │
└─────────────────────────────────────────────────────────┘
  │
  ▼
┌─────────────────────────────────────────────────────────┐
│ USER SELECTS ONE OF THE PANELS DISPLAYED IN THE BITMAP  │
│ AND CONTROLLER RELAYS CORRESPONDING ID CODE TO THE      │
│                     TARGET DEVICE                       │
│                          990                            │
└─────────────────────────────────────────────────────────┘
  │
  ▼
┌─────────────────────────────────────────────────────────┐
│   TARGET DEVICE RESPONDS TO ID CODE WITH SPECIFIC       │
│                       BEHAVIOR                          │
│                          992                            │
└─────────────────────────────────────────────────────────┘
  │
  ▼
RETURN
```

FIGURE 23

METHOD AND SYSTEM FOR PROVIDING AN EXACT IMAGE TRANSFER AND A ROOT PANEL LIST WITHIN THE PANEL SUBUNIT GRAPHICAL USER INTERFACE MECHANISM

This application claims the benefit of U.S. Provisional Application No. 60/145,627 filed on Jul. 26, 1999.

This application is a continuation-in-part of and claims the benefit of application Ser. No. 09/108,265 filed on Jul. 1, 1998, now U.S. Pat. No. 6,148,241, and which designated the U.S.

BACKGROUND OF THE INVENTION

1. Field of the Invention

The present invention relates to the field of consumer electronic devices. More specifically, the present invention relates to methods and systems for providing user interfaces for networked electronic devices including remote devices.

2. Related Art

The typical home entertainment system today consists of a variety of different consumer electronic devices which present and record audio/visual media in different ways. In the field of media devices, there is a spectrum of features for products of a given class (VCRs, video camera, etc.). Most of the features are represented by physical controls or elements on a control panel on the device which can be manipulated by a human user.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to covert digital data to an analog form before it is transmitted across the bus. Correspondingly, a receiving application will receive digital data from the bus, not analog data and will therefore not be required to convert analog data to digital form. The IEEE 1394 is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has introduced a powerful new platform on which device functionality and inter-operability can be built. For instance, in such a system, complex operations involving media transfers, media recordings and media presentation can be performed that involve two or more devices acting in concert. However, interaction between these devices can be complex, error prone and laborious if it is required that each device be directly touched in order to properly configure the desired operation. The problems associated with properly configuring the media operation can be exacerbated if one or more of the devices are remotely located and/or need constant attention and or adjustment. What is needed is an effective mechanism for interfacing with networked consumer electronic devices to facilitate media operations between two or more devices.

In addition, it is often desired to provide remote control access to the features performed by a consumer electronic device so that these devices can be accessed from a central location within a home or office. However, not all consumer electronic devices are able to provide a sophisticated display system for remote interaction, e.g., some devices offer only a small liquid crystal display (LCD) or a small collection of light emitting diodes (LEDs) as display devices. What is needed is a mechanism for interfacing remotely with devices that provides a sophisticated level of user interaction for many devices. Also, in many consumer electronic systems, each device can have its own remote control unit. In systems having even a modest amount of devices, the user discovers that three or more different and bulky remote control devices are required to perform media operations. What is needed is a mechanism for interfacing with electronic devices that reduces the problems of having different remote control units for different devices. What is needed further is a mechanism for interfacing with electronic devices that is flexible and can adapt to new devices and device types within the consumer electronics market.

Moreover, often the display required of a target device needs to be displayed on a controller device without altering the arrangement of the objects. For instance, electronic program guide (EPG) information needs to be arranged in a particular order for customary reference and understanding by a user. This is typically the case because the arrangement of this information has a strong meaning to the user. An effective method and mechanism are required for allowing a target device to communication information to a controller so that the arrangement of a particular display of information is not altered by the controller. In addition, in instances where a reduced processing capable controller is used, a quick and efficient system is required for the controller to identify the capabilities of the target and relay this information efficiently to the user.

SUMMARY OF THE INVENTION

Accordingly, the present invention provides an effective mechanism for interfacing with networked consumer electronic devices to facilitate media operations between two or more devices. The present invention also provides a mechanism for interfacing remotely with devices and that provides a sophisticated level of user interaction for many devices that themselves may have limited display capability. Specifically, the present invention provides a graphical user interface between a target device and a controller device whereby the target device can enforce a particular arrangement of the information displayed by the controller. This is accomplished by the target sending the controller exact bitmap images that are displayed by the controller. Also, the present invention provides a mechanism whereby a controller can quickly scan a root panel list to determine the functionality of the target and then, in response to a user command, the controller can generate the root panel display without further communication with the target.

The present invention also provides a mechanism for interfacing with electronic devices that operates using a central remote control station and a central display for instructing different electronic devices and for receiving status information regarding the different electronic devices. The present invention provides an interface mechanism for interfacing with electronic devices that is additionally flexible and can adapt to new devices and device types within the consumer electronics market. These and other advantages of the present invention not specifically mentioned above will become clear within discussions of the present invention presented herein.

Exact Image Transfer/Root Panel List. A method and system are described herein for providing an exact image transfer and root panel list within the panel subunit graphical user interface mechanism of networked electronic devices. The exact image transfer mechanism allows a target device to send a networked controller device a bitmap image of the exact display required of the target device. By transferring an exact bitmap of what is to be displayed, the target device can guarantee that the display rendered by the controller will not be modified or altered. This is useful in cases where the display represents an electronic program guide (EPG) or other suitable display that should be displayed with a predetermined arrangement and should not be altered by the controller. This is also useful in cases where the controller does not have a robust processing capability and therefore merely displays the exact bitmap sent by the target. Focus navigation is communicated from the controller to the target which then can alter the bitmap to illustrate an updated focus. Command pass-through can be used to communicate the focus navigation commands to the target. Command pass-through allows a target to predefine certain user commands that will be communicated directly from the controller to the target without using the panel subunit communication protocol. Command pass-through is useful for communicating commands from specialized keys associated with the controller, such as dedicated remote control buttons (e.g., guide key, selection up, selection down, selection right, selection left, etc.).

A root panel list maintained by the target can also be used to inform the controller of the capabilities of the target. The entries of the root panel list can be bitmap type, element type or analog video type. A controller can more readily generate the root panel without requiring more information from the target device and without having to render the entire panel subunit descriptor information for instances when a controller having a reduced processing set is used.

Panel Subunit. The exact image transfer and the root panel list can be implemented within the architecture of a panel subunit mechanism which is summarized below. A method and system are described herein for providing a user interface for a networked electronic device using panel subunit descriptor information maintained by a target device. The present invention utilizes a panel subunit to allow any compliant device (e.g., a target device) to describe the physical appearance of its controls and displays (e.g., elements) to another device (e.g., an intelligent controller) and allows the intelligent controller to trigger actions on the target device as if a user had physically manipulated the controls on the target device directly. The present invention operates within a network of consumer electronic devices, e.g., television (TV), set-top-box, video cassette recorder (VCR), compact disk (CD) device, personal computer system (PC), etc., that are coupled together using a standard communication protocol layer, e.g., the IEEE 1394 serial communication standard. An intelligent controller (e.g., a TV or set-top-box or both) monitors the network to discover the units coupled thereto and is programmed to locate panel subunits that are defined for a target device. The target device may be remotely located.

In general, the panel subunit then provides the intelligent controller with information for rendering a depiction of the controls and displays of the target device and this depiction can be interacted with by a user for remotely triggering actions by the target device. The panel subunit is defined such that command interpretations and image alterations are controlled by the target device thereby reducing the responsibility of the intelligent controller in managing the user interface with generic user events. This approach allows increased flexibility to expand the user interface and adjust to future control types and display information protocols.

The panel subunit uses control objects stored in an object descriptor list to define the physical controls of the target device. The control objects are defined with several standard types of controls and displays (e.g., push buttons, sliders, dials, LCD screens, etc.) that are commonly found on consumer electronic devices. The control types have well defined behaviors (e.g., buttons are pushed, dials are moved, values are input, etc.). In addition, the panel subunit defines a set of commands which are to be applied to any of these controls when selected by the user. The commands are defined to be sufficiently generic so that they apply to most types of controls. The panel subunit also defines generic user interaction commands (or user events) which can be applied to the controls (e.g., press, press and hold, release, input value, etc.) by a user. The purpose of these generic user events is to encapsulate the typical user manipulated action for the controls and to let the target device decide the manner in which to interpret the user actions on its own thereby relieving the intelligent controller of these responsibilities.

A status descriptor of the panel subunit keeps the intelligent controller informed of the status of the target device being manipulated. The status descriptor data structure is dynamic and is maintained up to date by the panel subunit. The intelligent controller examines the status descriptor to update its graphical display to indicate the target device status to the user. A panel status notification command allows the intelligent controller to post a notification request to the target device to indicate when any changes in the state of the target device result in a change in the status descriptor. Related controls of a target device can be grouped together into local groups which the panel subunit allows to be displayed or processed together in special ways.

More specifically, in a network of consumer electronic products, embodiments of the present invention include, in a network of electronic devices, a method of controlling a target electronic device, the method comprising the steps of: a) the target generating a bitmap image containing objects and sending the bitmap image to a controller; b) the controller displaying the bitmap image without modifying the arrangement of the objects within the bitmap image and wherein at least one of the objects is a default focus; c) the controller sending the target a first command code; d) the target, in response to the first command code, altering the default focus to a first updated focus and generating a first updated bitmap image reflecting the first updated focus, the target sending the first updated bitmap image to the controller; and e) the controller displaying the first updated bitmap image without modifying the arrangement of objects within the first updated bitmap image. Embodiments also include the above and wherein the bitmap images represent electronic programming guide information.

Embodiments also include an electronic network comprising: a target device comprising computer readable memory containing a root panel list comprising a plurality of entries wherein each entry corresponds to a function of the target device, each entry also containing a field for indicating a visual appearance of a respective panel and containing a field for indicating an identification code; and a controller device coupled to the target device and operable to read the root panel list of the target device, the controller device, in response to a user command, operable to generate a root panel display containing a plurality of panels based on the root panel list, wherein the controller device is operable to communicate an identification code to the target device in response to a panel of the root panel display being selected; and the target device identifying a function based on the identification code and executing the function.

BRIEF DESCRIPTION OF THE DRAWINGS

FIG. 7A and FIG. 7B illustrate exemplary control object descriptors in accordance with the panel subunit of the present invention.

FIGS. 16A, 16B and 16C are three exemplary bitmap images generated by the exact image transfer mechanism of the present invention in response to user navigation.

FIG. 19A and FIG. 19B illustrate the root panel list components and resulting display in accordance with one embodiment of the present invention.

FIG. 21 is a diagram of the structure used for decimated video images.

FIG. 23 is a process used by the present invention employing root panel lists when the controller device can generate the root panel display.

DETAILED DESCRIPTION OF THE INVENTION

Figure 1:
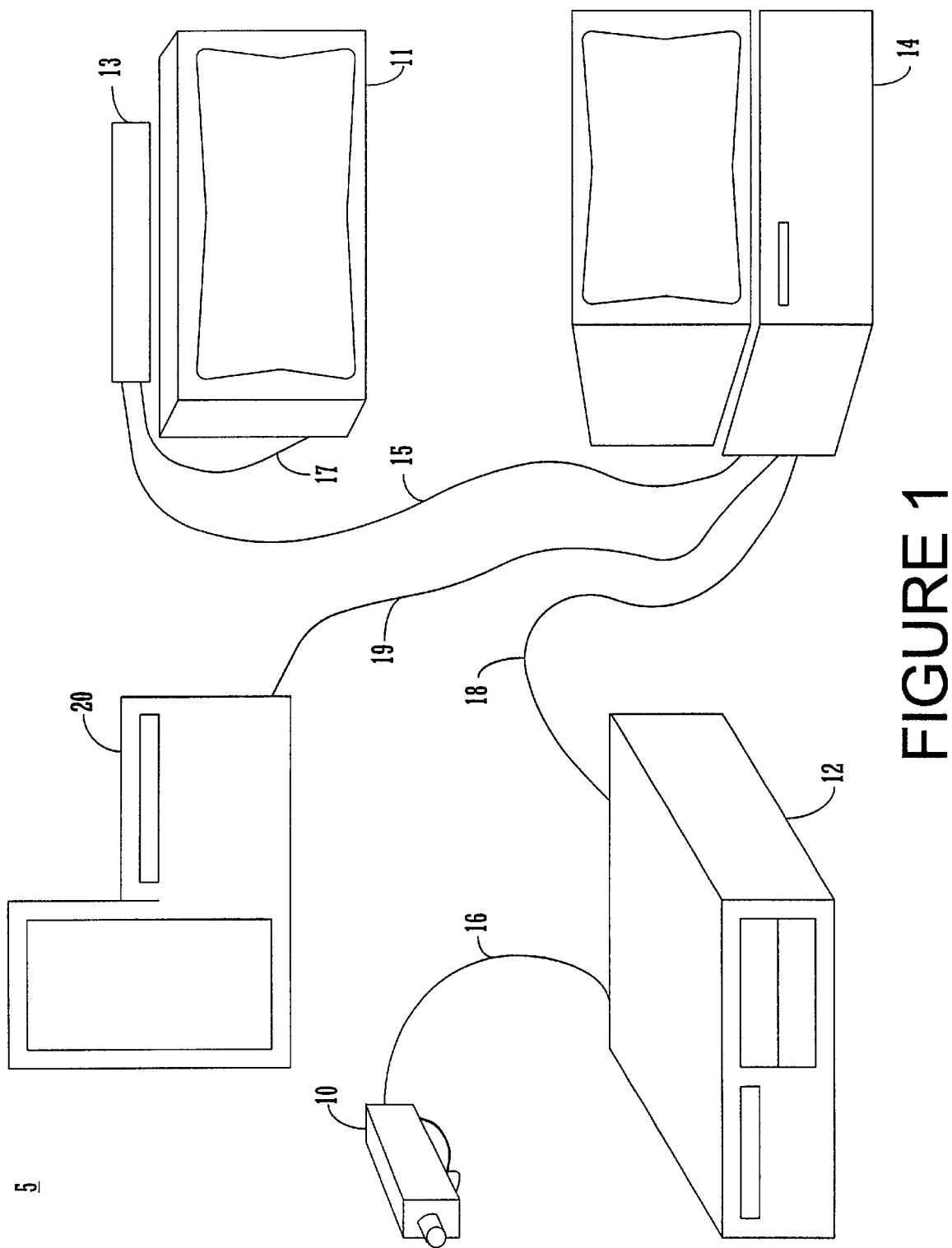
FIG. 1 illustrates an exemplary networked system of electronic devices including a video camera, a video cassette recorder, a computer, a set-top-box, a television and a compact disk changer.

In the following detailed description of the present invention, an exact image transfer mechanism and a root panel list mechanism for use with a panel subunit for remotely interfacing with a target device via an intelligent controller within a network of consumer electronic devices, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Aspects of the present invention can be implemented within the panel subunit architecture described in copending U.S. patent application Ser. No. 09/108,265, entitled, "a Method and System for Providing a User Interface for a Networked Device Using Panel Subunit Descriptor," by Ludtke, Kawamura and Shima, filed Jul. 1, 1999, assigned to the assignee of the present invention and hereby incorporated by reference. (Also incorporate by reference the Command Pass-Through Patent Application here.)

Embodiments of the present invention are drawn to a panel subunit that allows any compliant device (e.g., "target device") to describe its physical appearance including controls and displays, etc., to an outside intelligent controller device. The target device can be remote to the intelligent controller. The intelligent controller then generates a user interface for the target device including: 1) interactive controls; and 2) user display information pertinent to the target device. The panel subunit allows the intelligent controller to trigger actions on the target device as if a user had physically manipulated the controls of the target device. The intelligent controller and the target device are connected to the same communication network (e.g., using the IEEE 1394 serial standard). The present invention can also be used in one embodiment to promote high levels of inter-operability between any of the devices which support the well known AV/C command and control protocol.

Generally, the present invention allows an intelligent controller to communicate with the panel subunit of the target device and inquire about the various types of controls which it has, e.g., buttons, sliders, etc. The intelligent controller then generates, on its display, a human interface based on these control object descriptions, and when the user manipulates this human interface, the controller sends special user events to the target device. The information that is capable of being displayed by the intelligent controller can be made scaleable by the target device so that the human interface displayed can adapt to the particular display capabilities of the intelligent controller device. The intelligent controller monitors the target device to maintain the most current status presented to the user.

Thus, the intelligent controller does not need to have advance knowledge of any specific features in the target device or how they are used or invoked because this functionality is the responsibility of the target device. All issues such as state transitions and inter-control dependencies are handled automatically the by target device independently of the intelligent controller responsibility. The present invention removes all requirements for items such as state transition tables and their execution environment, because it takes advantage of the functionality that is already built into a media device and used to handle the physical buttons as they are manipulated by the user. For instance, when the intelligent controller asks the target to "simulate the press of button 5," the intelligent controller does not need to have any knowledge at all about what is happening within the target device upon being notified of the user action. The state transition logic for what happens when "button 5" is pressed is all contained within the target device. This is advantageous because it enhances the inter-operability between the intelligent controller and the target device while at the same time greatly reduces the responsibilities of each.

In addition to describing physical controls and appearances, the present invention can be used to describe logical controls and appearances of elements of a logical control panel. For instance, a logical control panel can be used to control a "black box" not having any physical controls but having only a 1394 connector with the black box being located in a closet or other remote location. In this case, the black box is manipulated with on screen controls via its panel subunit thereby having no physical control panel itself.

NETWORK ENVIRONMENT OF THE PRESENT INVENTION

FIG. 1 illustrates an exemplary network system 5 that can support the embodiments of the panel subunit of the present invention. Exemplary system 5 includes consumer electronic devices (including computer systems) as nodes but could be extended equally well to cover other electronic devices. System 5 includes a video camera 10, a video cassette recorder (VCR) 12, a computer system 14, a set-top-box (STB) 13, a television set (TV) 11 and a compact disk (CD) changer 20 connected together with the network by IEEE 1394–1995 (IEEE 1394) cables 15, 16, 18 and 19. It is appreciated that the panel subunit embodiments of the present invention are equally well suited for application with any bus structure and the IEEE 1394 bus structure is shown and described herein as an example bus architecture only. The STB 13 can be coupled to receive media from a cable TV system. The IEEE 1394 cable 16 couples the video camera 10 to the VCR 12 allowing the video camera 10 to send data, commands and parameters to the VCR 12 for recording (or to any other device of the network 5). The IEEE 1394 cable 18 couples the VCR 12 to the computer system 14 allowing the VCR 12 to send data, commands and parameters to the computer system 14 for display (or to any other device of the network 5).

The IEEE 1394 cable 15 couples the STB 13 to the computer system 14. The STB 13 is also coupled to the TV 11 by the cable 17. The CD changer 20 is coupled to the computer system 14 by the IEEE 1394 cable 19. The configuration 5 illustrated in FIG. 1 is exemplary only and it should be apparent that an audio/video network in accordance with the present invention could include many different combinations of components. The devices within an IEEE 1394 network 5 are autonomous devices, meaning that in an IEEE 1394 network, in which a computer is one of the devices, there is no true master-slave relationship between the computer system 14 and the other devices. In fact, as described below in an exemplary embodiment of the panel subunit of the present invention, the intelligent controller is the STB 13. In many IEEE 1394 network configurations, a computer system 14 may not be present. Even in such configurations, the devices within the network are fully capable of interacting with each other on a peer-to-peer basis. It should be recognized that data, commands and parameters can be sent between all of the devices within the IEEE 1394 network 5.

The IEEE 1394 serial bus used by system 5 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard within system 5 of FIG. 1 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a VCR 12 to TV 11 of FIG. 1. The VCR 12 records images and sounds and saves the data in discrete packets. The VCR 12 then transfers each packet, representing the images and sounds recorded over a limited time period, during that time period, for display by the TV 11. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

INTELLIGENT CONTROLLER

User interface aspects of the panel subunit of the present invention are implemented within an intelligent controller device. The intelligent controller can be any device coupled within a networked system (e.g., system 5 of FIG. 1) designated by the user and having certain basic input functionality and basic display capability. In one embodiment of the present invention, the STB 13 and the TV 11 act as the intelligent controller. In other embodiments, the computer system 14 can act as the intelligent controller or the TV 11 can act alone as an intelligent controller. Any device having "display" and input capability can act as the intelligent controller, e.g., a personal digital assistant (PDA), a hand-held electronic device, a cell phone, etc.). Within the context of the present invention, the intelligent controller is the device that provides a user interface for controlling events on another, remote, target device within the network 5. To this extent, the intelligent controller communicates with a display device and an information input device. The display and input capabilities of the intelligent controller device define the type of user interface that the intelligent controller can provide to a user and the panel subunit of the present invention allows the definition of scaleable user interface capabilities.

Figure 2:
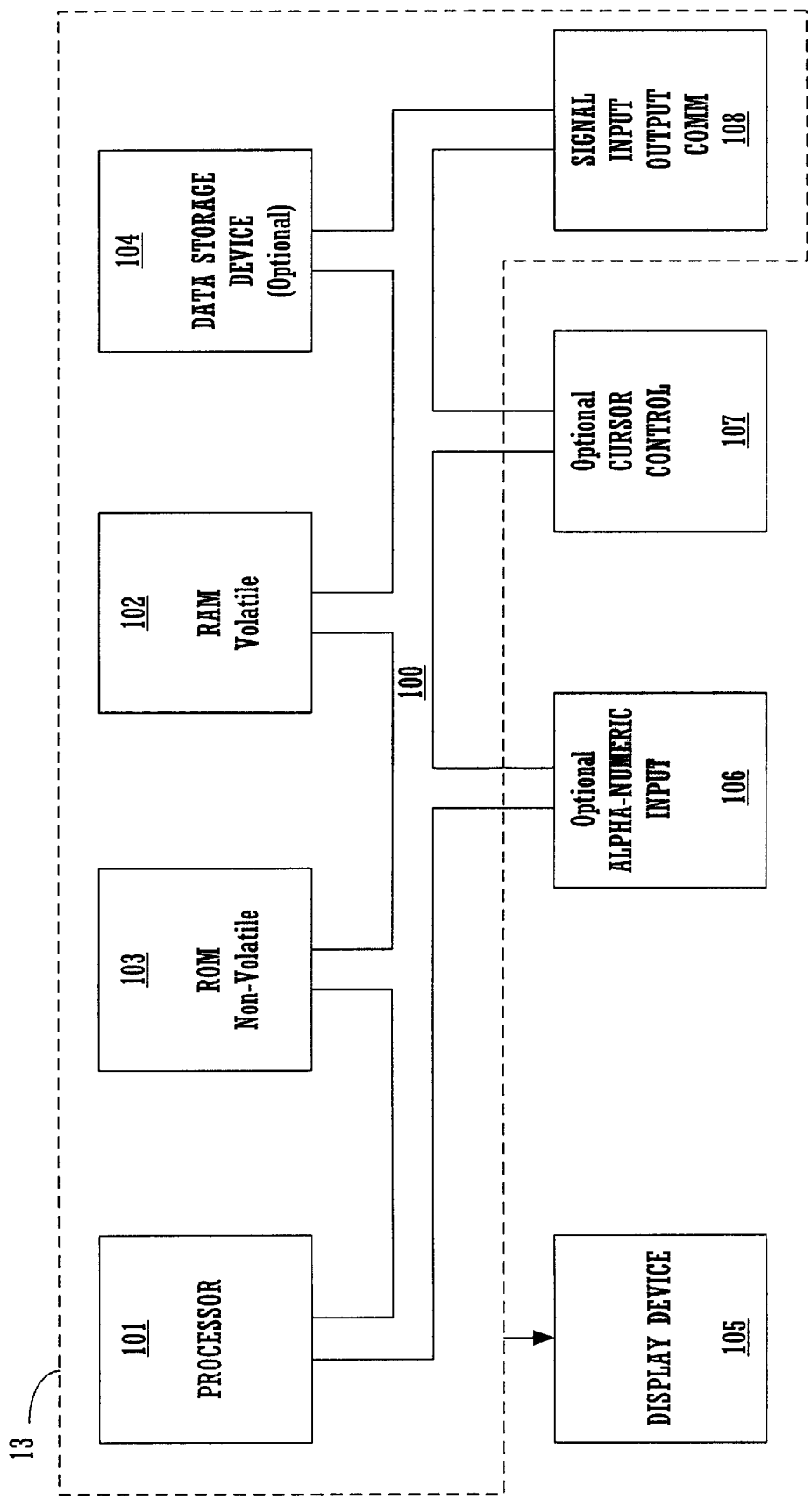
FIG. 2 illustrates components of an intelligent controller in accordance with the present invention.

FIG. 2 illustrates the components of the intelligent controller, and in this example it is the STB 13. STB 13 includes an address/data bus 100 for communicating information, a central processor 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. STB 13 can also optionally include a data storage device 104 ("disk subsystem") such as a magnetic or optical disk and disk drive coupled with the bus 100 for storing information and instructions. In one embodiment, the display device 105 can be part of the intelligent controller. As shown in FIG. 2, the display device (e.g., TV 11) is external to the STB 13. When incorporated into the intelligent controller, the display device 105 can be a display screen (e.g., flat panel or CRT, etc.) or it can be a liquid crystal display (LCD) panel or other suitable display device for the display of alphanumeric and/or graphic information.

The intelligent controller 13 also interfaces with or includes one or more user input devices. In one embodiment, the input device can be an alphanumeric input device 106 including alphanumeric and function keys coupled to the bus 100 for communicating information and command selections to the central processor 101. Alternatively, or in addition, the intelligent controller 13 can interface with or include a cursor control or cursor directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. In addition, the user input device can also be a remote control device, e.g., a universal remote control device having a number of buttons, dials, etc., with an infra-red signal communication capability. STB 13 can also include a signal generating device 108 coupled to the bus 100 for interfacing with other networked devices over the IEEE 1394 bus.

The target device of the present invention can also include one or more components as described with respect to FIG. 2. Particularly, the target device in accordance with the present invention includes computer readable memory units which can include one or more ROM and/or RAM units for storing panel subunit information of the present invention which are described below.

PANEL SUBUNIT OF THE PRESENT INVENTION

The present invention defines a subunit type called a "panel" subunit. The panel subunit is defined for a target device and outlines characteristics for generating a user interface on an intelligent controller device (e.g., STB 13) of a network system 5. The panel subunits can be defined for multiple target devices and therefore many panel subunits can be included within a network system 5. For a particular target device, its panel subunit can be stored as a data structure within computer readable memory units of the particular target device.

Figure 3A:
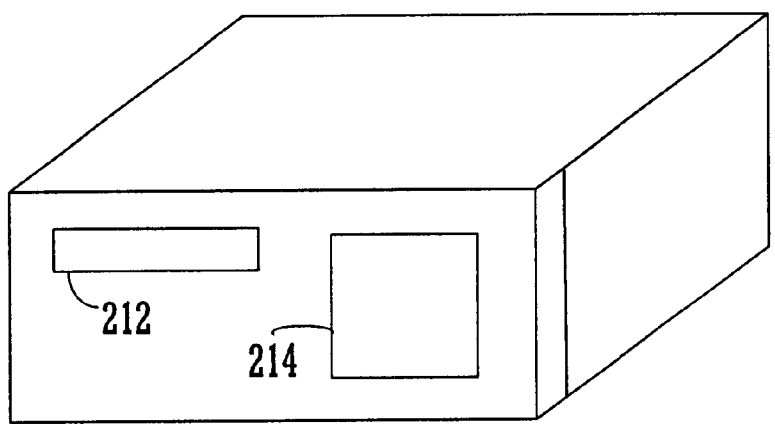
FIG. 3A is a perspective view of a target device having panel display elements and panel control elements.

FIG. 3A illustrates a perspective view of the VCR 12 of FIG. 1 as an exemplary target device. Although, generally, any electronic device can have its own panel subunit and thereby be a "target device," the following discussion illustrates an exemplary case where the VCR 12 is the target device. VCR 12 contains a video tape slot 212 for insertion and removal of video tape media. The VCR 12 also contains one or more liquid crystal displays (LCDs) 214.

Figure 3B:
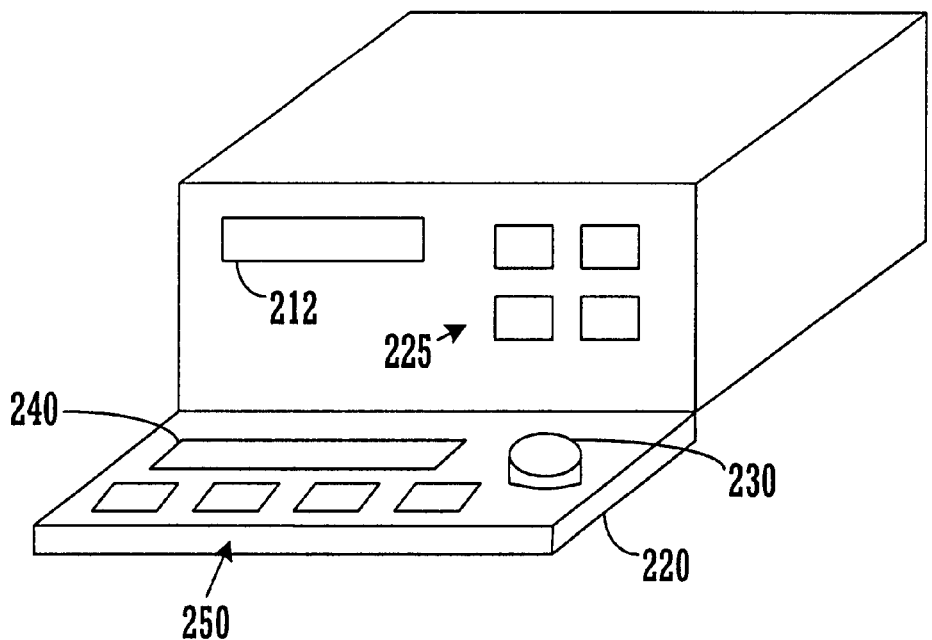
FIG. 3B is a perspective view of the target device of FIG. 3A having a front panel in the flipped-open state to expose more control and display elements.

FIG. 3B illustrates the VCR 12 with a control panel 220 flipped-down exposing certain controls and further displays (e.g., "elements"). The control panel 220 contains another LCD display 240 and includes a scrubber control 230 or "dial." The control panel 220 also contains certain tape transport controls 250 (including play, pause, stop, rewind, fast-forward, buttons etc.). When the control panel 220 is flipped down, it exposes tuner preset buttons 225. In the present invention, devices can have more than one logical control panel. In this configuration, the VCR 12 has two logical subpanels. The first subpanel includes the controls and display of the flip-down control panel 220 and the second subpanel includes the tape slot 212 and the tuner preset buttons 225. Another subpanel could define the LCD panel 214.

Figure 4:
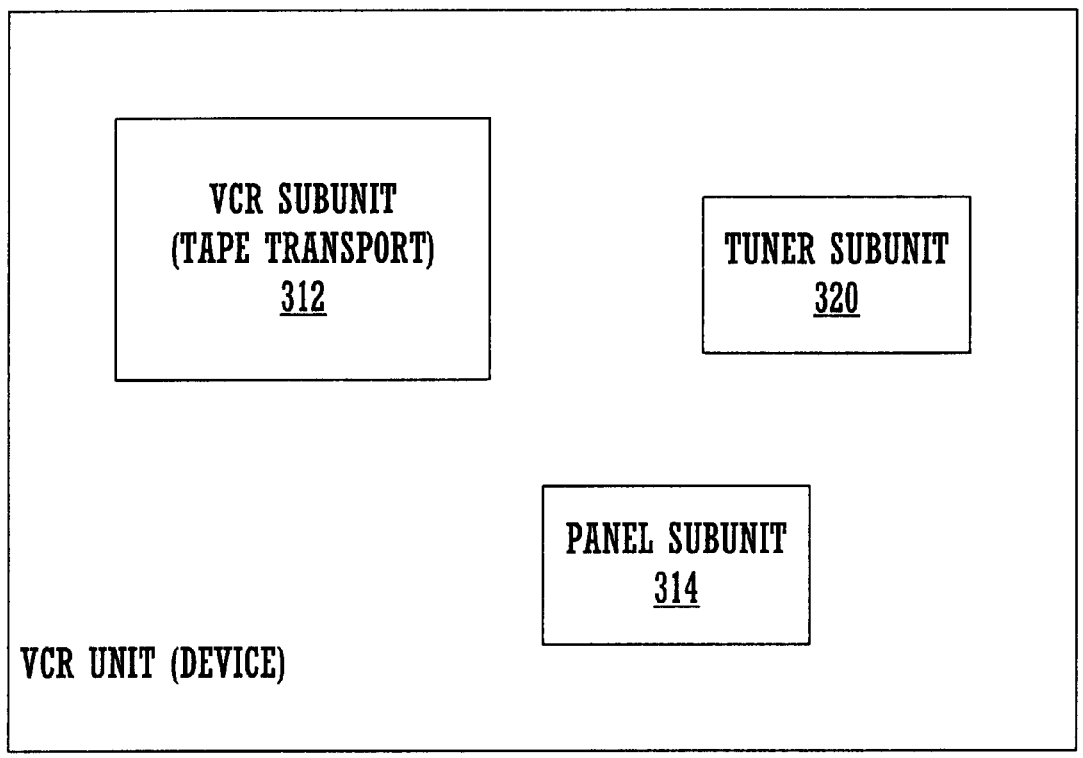
FIG. 4 illustrates a logical block diagram of the subunits located within a target device (a VCR) including the panel subunit of the present invention.

FIG. 4 illustrates a logical block diagram of some of the subunits that can be associated with VCR 12 in accordance with the present invention. Within the well known AV/C protocol, subunits are logical, not physical, groupings of functionality that can be individually addressed and controlled within a device. For example, a VCR device 12 can have two subunits, one subunit 312 for the actual VCR tape transport mechanism, and another subunit 320 for the tuning functionality. The panel subunit 314 of the present invention adds a novel logical subunit that can be associated with the VCR device 12. As described further below, the panel subunit 314 of the present invention is realized, in one embodiment, as one or more data structures stored in computer readable memory units of the target device e.g., the VCR unit 12. It is possible for a panel subunit for a first device (e.g., of limited memory capacity) to exist on a second device (having more memory), whereby the second device acts as a proxy for the first device's panel subunit.

The panel subunit 314 is a collection of data structures called "descriptors" that describe the physical controls on the target device (e.g., the control panel). In operation, the intelligent controller (e.g., STB 13) accesses the panel subunit 314 of the target device, and based thereon, implements a user interface for using the target device (e.g., the VCR 12). The user interface involves the display (e.g., TV 11) and user input devices associated with the intelligent controller, as described with respect to FIG. 2. The specification for the panel subunit 314 defines several standard types of controls and displays that are commonly found on consumer electronic devices, such as push buttons, sliders, dials, LCD screens, etc. As an example, the descriptions within the panel subunit 314 for VCR 12 could represent the buttons, dial and LCD screens of FIG. 3A and FIG. 3B.

The control types defined by the panel subunit 314 have well defined behaviors. For instance, buttons are pushed and released and typically have two values, sliders may have several discrete values or a continuous range of values. Further, some standard control types may be combined within the descriptors to form hybrid or custom controls. One example of this is a dial with a push button in the middle or a button with an LED in the middle. Such composite control mechanisms are supported by the panel subunit of the present invention. Finally, vendor specific custom controls may also be defined.

In addition to standard control types, the panel subunit 314 of the present invention also defines a set of commands which may be applied to any of these controls. The commands are defined to be sufficiently generic so that they apply to most types of controls. For example, issuing the command SET CONTROL VALUE (control 1, 6) by the intelligent controller may cause a volume slider to be set to the value 6, representing a change in volume. Likewise, the same command type with different operands can be issued as SET CONTROL VALUE (control 5, "please enter the track name"), and it would cause that text to show upon the LCD display of a MiniDisc recorder 20, prompting the user to enter a name for a track on the disc. Further, within the panel subunit, some commands can be specific to certain kinds of controls.

The panel subunit 314 also defines "user interaction commands" or user events which can be applied to the controls of the user interface. The purpose of these generic user events is to encapsulate the typical user manipulation actions for controls, and to let the target device interpret what it means when these user events occur thereby freeing the intelligent controller of this responsibility. For example, many CD players 20 have multiple semantic meanings for the fast forward button on the device and these meanings are affected by the current state of the device. Consider the following:

TABLE I

| Current Device Setting | Action | Result |
| --- | --- | --- |
| Device Is Not Playing | FF Button Pressed | Advance to the Next Track and Hold |
| Device Is Playing | FF Button Pressed | Advance to the Next Track and Continue Playing from that Point |
| Device Is Playing | FF Button Pressed and Held Down | Play in "Fast Forward" Mode |

As shown above, the actions taken by the target device vary based on its current state and what the user does with the physical controls. The panel subunit of the present invention defines several user action commands such as "PUSH," "PRESS AND HOLD," and "RELEASE" that are triggered by user interaction with the displayed user interface. In accordance with the present invention, the intelligent controller of the present invention has no notion of what the target device will do in response to the commands that are issued to it. All concerns regarding the state transition as shown in the Table I are handled inside of the target device. It is appreciated that the target device already needs to have this logic in place in order to process the user interaction on its physical control panel. The panel subunit of the present invention is viewed as another mechanism by which to access these logical entry points.

It is important that the intelligent controller always keep the user informed regarding the status of the target device being controlled. In one embodiment, it is possible that the intelligent controller and the user are sitting in one room of a house or business office and the target device is located in another room or office. Because the intelligent controller has no pre-defined knowledge of how to interpret the user interaction elements, it needs to have a mechanism of keeping its display updated with the most current status of the target device. It does this by making use of the status reporting mechanism that has been defined for the AC/C protocol, in one embodiment, using a status descriptor data structure and a panel status notification command in accordance with the present invention.

The status descriptor data structure is a dynamic data structure that is always kept up-to-date by the panel subunit 314 of the present invention. The intelligent controller can examine this structure at any time so that it can update its graphical display to indicate the target device status to the user. The panel status notification command of the present invention allows the intelligent controller to post a notification request to the target device. When any change in the state of the device results in a change to the status descriptor data structure, then the target device sends a notification to the intelligent controller. The intelligent controller then updates its graphical display as appropriate in response to the status information.

Figure 5:
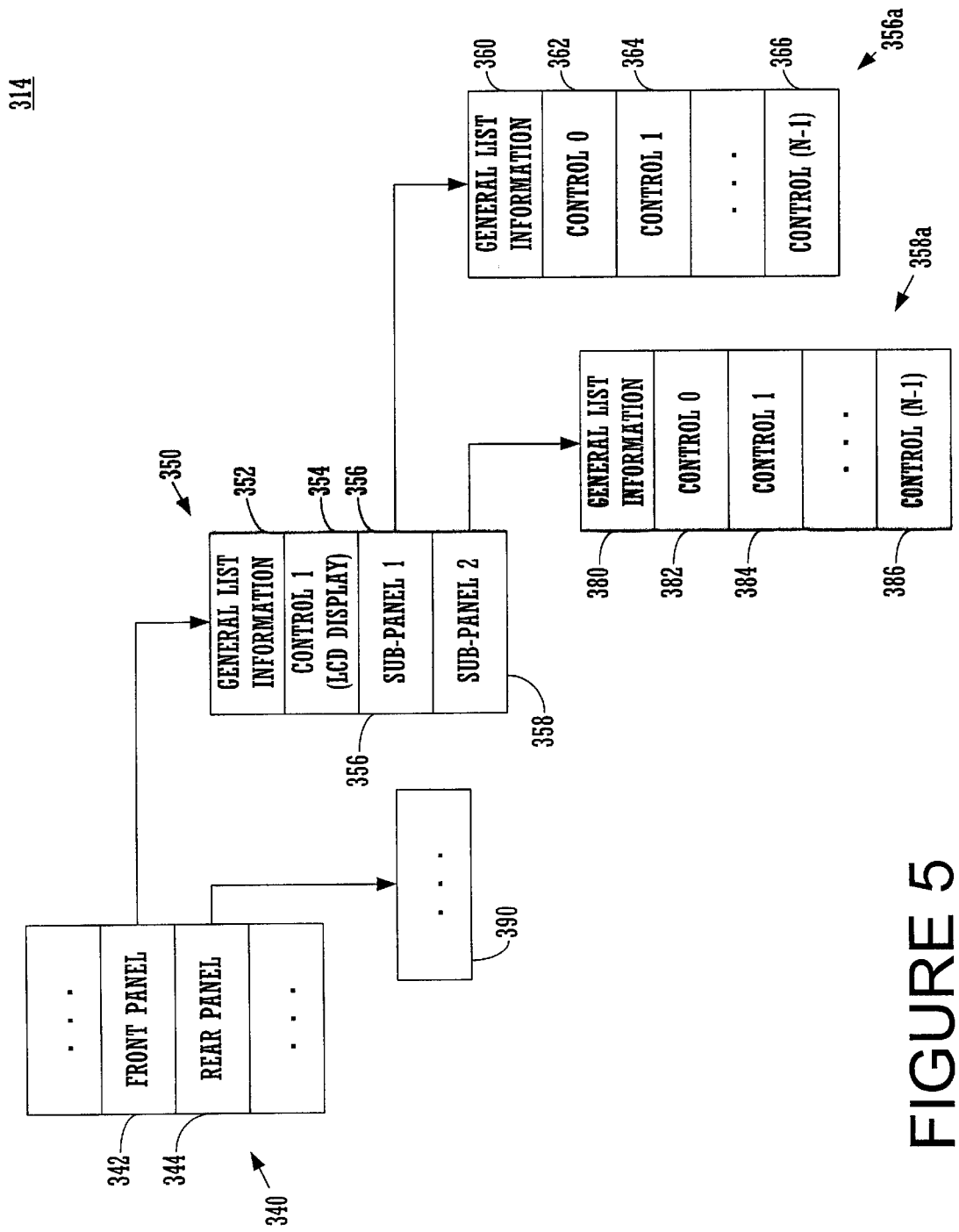
FIG. 5 illustrates descriptor information of a panel subunit in accordance with the present invention including a subunit identifier descriptor, panel lists and object lists of control objects.

The AV/C protocol allows a device (also called a unit herein) to contain any number of subunits of the same type. Therefore, a device can have more than one panel subunit of the present invention. For instance, one panel subunit can be defined for the front panel of FIG. 3B and another panel subunit can be defined for the flip-down panel 220. Other panel subunits can be defined for the side and back panels, if any. Alternatively, a single panel subunit can be defined to encompass several controls as shown in FIG. 5. In this approach, a single panel subunit can contain any number of control lists which are hierarchically ordered. Each control list of the present invention represents a control panel of the target device. All of these lists are accessed via the single panel subunit 314.

Part of the panel subunit data structures includes geometry information describing the layout image and orientation of panels and controls so that they can be represented to the user in a manner similar to their physical appearance on the target device or in a manner "suggested" by the target device. As standard controls can be combined into hybrid controls, this geometry information can also be defined to indicate the presence of panel hierarchies, such as panels hidden behind a front flip-down face 220 (FIG. 3B). This is commonly found in many VCR devices where some basic controls are on the face of the VCR device and the more advanced controls and features are hidden behind the flip-down front panel 220.

PANEL DESCRIPTORS OF THE PANEL SUBUNIT

FIG. 5 illustrates data descriptor information maintained by computer readable memory units of a target device, e.g., VCR 12. It is appreciated that the data descriptor data structures found in FIGS. 5–8 and 11 are all maintained and realized within computer readable memory units of the target device in accordance with the present invention. The panel subunit 314 (FIG. 4) includes a panel subunit identifier descriptor data structure 340. The identifier descriptor list 340 indicates identifiers for each of the main panel lists supported by the panel subunit 314. Each of these panel lists can contain a control object which has a child list, indicating a panel hierarchy. For instance, primary identifier list 340 relates to the front panel for the target device and includes an identifier (e.g., pointer) 342 which points to a secondary identifier structure 350 which itself includes two sub-panel descriptions (e.g., one for the face of the VCR 12 and one for the flip-down panel 220). The primary identifier 340 also includes an identifier (e.g., pointer) 344 for another secondary identifier list 390 describing a rear panel for the target device. In this manner, the main identifier and the secondary identifier structures of the panel subunit 314 can define hierarchical relationships between the descriptor list information and thereby between the panels and sub-panels themselves.

The secondary identifier descriptor list 350 of FIG. 5 is a descriptor list including a general list information field 352 and one object control descriptor 354 for describing the LCD display 214 (FIG. 3A). A descriptor list within the present invention can include object control descriptors, general information, and pointers to child descriptor lists. Therefore, a control object within a descriptor list can point to another descriptor list indicating a parent-child relationship between the control object and the indicated descriptor list. Descriptor list 350 includes a pointer 356 indicating a child descriptor list 356*a* used to describe "sub-panel1" which is a portion of the controls of the front panel for VCR 12 in this example. Further, descriptor list 350 includes a pointer 358 indicating a child descriptor list 358*a* used to describe "sub-panel2" which is another portion of the controls of the front panel for VCR 12. In this example, the descriptor list 356*a* for sub-panel1 defines the controls on the face of VCR 12, e.g., buttons 225 for the tuner subunit 320. The descriptor list 358*a* for sub-panel2 defines the controls on the flip-down control 220 of VCR 12, e.g., buttons 250, display 240, and dial 230.

As with any descriptor list data structure, descriptor lists 356*a* and 358*a* each contain a respective general list information field 360 and field 380 and also contain respective lists of control objects. In accordance with the present invention, a list which contains control objects for a panel is used to describe the control panel itself, as well as to hold the collection of objects. Generally, information that describes the collection (the panel description) would contain the following: (1) panel identifier (e.g., front, back, left side, etc.); (2) panel layout geometry (e.g., size of panel, orientation of controls, definition of groups, etc.); (3) group descriptions for each group of controls where the following can be defined, group label, group bounding box/position within the panel, and other group related information; and (4) a name for the panel subunit. An example is shown in FIG. 6.

Figure 6:
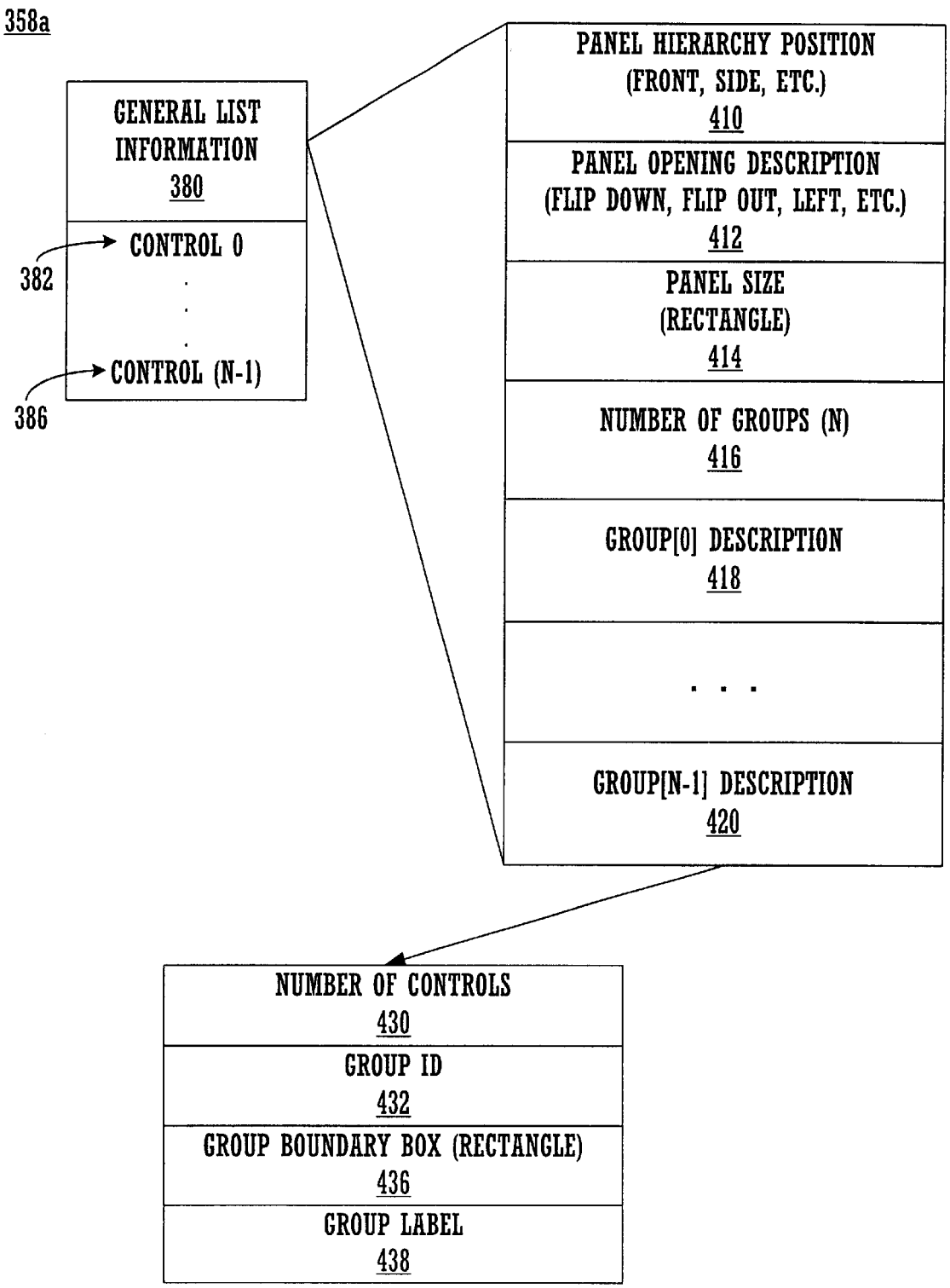
FIG. 6 illustrates the contents of the general list information structure including a group identification structure in accordance with the panel subunit of the present invention.

FIG. 6 illustrates the information included within the general list information data structure 380 of the secondary descriptor list 358*a* for the front sub-panel1 of the target device. Secondary descriptor list 358*a* contains general list information 380 and a collection of n objects 382 to 386. Exemplary data structure 380 includes fields 410–420. Field 410 indicates the hierarchical position or identifier for the descriptor list 358*a* in which the field is included. For instance, field 410 indicates which physical panel the information represented, e.g., whether this descriptor list 358*a* represents a front, side, rear, etc., control panel. In this example, descriptor list 358*a* is a "front" panel. Field 412 defines the opening or access options used to obtain access to the control panel for which descriptor list 358*a* is defined, e.g., flip-down, flip-up, flip-out, left, right, direct access, etc. In this case, control panel 220 (FIG. 3B) has "flip-down" style access. Field 414 defines the general size and shape of the control panel for which descriptor list 358*a* is defined (e.g., rectangle, circular, oblong, triangle, polygon, etc.). In this case, control panel 220 is rectangular in shape.

Fields 416–420 of FIG. 6 are used to define groups within the control panel for which descriptor list 358*a* is defined. Groups can be used to separate certain control features that are similar or control a similar function or feature. For instance, buttons that each relate to the control of the tape mechanism for a VCR 12 can be assigned into one group while buttons that control the channel selection or the volume selection of the VCR 12 can be assigned in a separate group. Groups have special functions within the present invention, e.g., they can be displayed spatially together on the display of the intelligent controller, and can have other defined attributes in common. Field 416 indicates the number of groups defined for descriptor list data structure 358*a* and fields 418–420 represent the group description information for a number of exemplary groups.

FIG. 6 illustrates fields 430–438 which represent an exemplary group description that is contained in field 420 for an exemplary group (n–1). Information field 430 includes the number of control objects that are defined for this group. Field 432 includes a group identification number or string that is unique for this group and used to identify the group by control objects. Each control object that is to be included in the defined group includes the identifier 432 in its object description (described below). Field 436 indicates the spatial boundary box in which this group is included for the control panel. This information indicates where this group exists with respect to other defined groups in the user interface layout and is used for rendering the image of the control panel on the display of the intelligent controller. Field 438 is a group label that can be used to provide access to and represent the control objects of this group for cases where the display unit of the intelligent controller is not sophisticated enough to provide images or further information. Field 438 typically contains a string or other text label that can be used, in one embodiment, as a tab index in a tabbed-panel presentation of information. In a tabbed-panel presentation, all the defined tabs for all groups are displayed along the side of the display and groups are selected for presentation by selecting one tab or another.

Figure 7A:
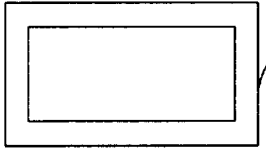
Figure 7A:
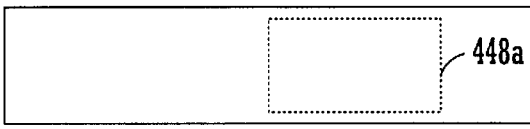

FIG. 7A illustrates the data of a control object 382 in accordance with the panel subunit of the present invention. Exemplary control object 382 is included within descriptor list data structure 358*a*. In one embodiment, the panel subunit of the present invention presents its information to controllers via the AV/C object and object list data structures. These data structures are generic containers whose contents are specialized based on the owner of the structure. A panel subunit of the present invention contains a list of its controls (e.g., list descriptor 358*a*), with each control being represented by a control object in the list. Within the present invention control objects can be defined to represent user input devices (e.g., buttons, sliders, toggle switches, etc.) and can also be defined to represent information displays (e.g., LCD panels, dials, etc.).

FIG. 7A illustrates the information of a control object 382 representing the LCD panel 214 of FIG. 3A. Field 440 describes the type of control object being defined. In this case it is "LCD Panel" type. Other control types for displaying information include "Display," "Dial," "CRT Display," "LED" and "Alpha/Numeric Display." Other control types for information input devices include "Button," "Slider," "Rotator," "Toggle Switch" and "Rocker Switch." Field 442 includes a graphical image of the control object. This image information is typically raster data (e.g., bit mapped) and may include color and other attribute data. In this particular instance, the control image 442*a* is in the shape and character of the outline of an LCD display to represent LCD panel 214. Field 442 could also contain a collection of images used for performing animation in a predefined sequence of presentation. Field 444 represents the dimensions of the image 442*a* and in one embodiment is represented in screen coordinates (x, y). To generalize these coordinates for application with many screen dimensions, the (x, y) values can be represented in relative terms with respect to the left corner, e.g., the (0, 0) coordinate position, of the display screen.

Field 446 of FIG. 7A represents the group identification or name with which this control object 382 is associated. Controls can be clustered into groups based on layout information defined by the panel subunit of the present invention. This field 446 is optional as an object does not necessarily need to be associated with any group at all. If a group is associated with this control object 382, then field 448 represents the relative position 448a within the group boundary 448b in which this control object 382 belongs. This information can be expressed in coordinate values. Field 450 represents the allowable or valid value ranges that can be taken by this control object in response to a user event. This field 450 can also include a data type indicator (e.g., 16-bit representing integer, floating point, etc.) In the case of a display object, field 450 represents the character or icon sets that can be displayed within the control object. In the case of a user input control object, field 450 indicates the range of possible values that can be set by this control object. If the control object was a slider, then a range of values is appropriate. If the control object is a button or toggle switch, then possibly only two states (e.g., 0 or 1) are valid for the control object.

Field 452 of FIG. 7A is optional and represents the equivalent AV/C command that occurs when the control object 382 is activated. This AV/C command can be communicated by the intelligent controller over the network within system 5 when the control object 382 is invoked. Field 452 is optional because the target device has the capacity to interpret changes in the control object as communicated to it by the intelligent controller without the need for a communicated AV/C command. The panel subunit 314 represents the VCR 12 in this example. The manipulation of those controls may cause a state change in other subunits within the target device. The values of field 454 represents which subunit (subunit type and ID) can be effected by this control object. Field 454 is likewise an optional field that indicates the identification of the target device associated with the control object. Again, this information is optionally included within the control object 382 but is maintained by the intelligent controller by virtue of which target object contained the panel subunit in the first instance.

Field 456 is an identifier or name string that can be associated with the control object. In instances where the display device of the intelligent controller is not sophisticated, field 456 can be used to at least provide a basic textual description of the control object which is presented for user interface functionality. Field 458 contains a help string that can be displayed on the display of the intelligent controller if a help feature is employed by the user. The help string describes what the control object does. This can be extended to provide a help string for each state of the control object. The help string can identify the control object and give tips on how to use the control object, its purpose and expected functionality and value range.

FIG. 7B illustrates information associated with an exemplary control object 384 for one of the push buttons of buttons 250 of the flip-down panel 220 of FIG. 3B. In this example, the "Play" button is being represented for VCR 12. Field 460 defines the control object as a "button" control type. Field 462 can contain multiple images or "icons" that can be used for displaying the control object. The icons can, for instance, represent different states of the control object, e.g., such as a button which is highlighted differently whether it is pressed or released. Field 462, in this case, contains a number of icons that represent the image of the button in different states (e.g., pressed or released). Image 462a represents the image for the button pressed and image 462b represents the image of the button for the button released. Field 464 represents the screen dimensions of the images of field 462 and field 466 represents a group identification, if any, for control object 384. In this case, all of the buttons 250 (FIG. 3B) are clustered together into a single group because they control the tape mechanism for VCR 12, e.g., Group Identification="Tape Mechanism," where this group would have to have been previously defined in a data structure of FIG. 6.

Field 468 represents the relative position 468a of the control object 384 within the group boundary 468b. In this case, the control object 384 represents the third button from the left within the collection of buttons 250. Field 470 represents the possible range of values can be represented by the button, e.g., in this case 0 to 1, and the value is an integer. If the control object was a slider, then a possible range of values (e.g., 0 to 10) could be represented with the values being integer or floating point type.

Optional field 472 represents the equivalent AV/C command for "Play" and can be communicated by the intelligent controller when control object 384 is pushed. When a user event such as PRESS is issued, it may result in the same action as if a standard AV/C command, such as the VCR subunit PLAY command, had been issued. The value of field 472 is the opcode of the equivalent AV/C command. Optional field 474 represents the network identification for the target device (in this case, the VCR subunit). Field 476 is an identifier or name string that can be associated with the control object, e.g., "Play." In instances where the display device of the intelligent controller is not sophisticated, field 476 can be used to at least provide a textual description of the control object which is presented for user interface functionality. Field 478 contains a help string that can be displayed on the display of the intelligent controller if a help feature is employed by the user, e.g., "Press Play to Start Watching A Tape in the VCR." The help string could also describe why the control object is in a particular state, e.g., "The Play Button is Disabled Because There is No Tape in the VCR."

It is appreciated that the control objects of FIG. 7A and FIG. 7B are exemplary only and that other similar control object descriptions can be used to realize a user interface for all user inputs and user displays of the VCR 12 for all control panels. It is further appreciated that each other control object of FIG. 5 can analogously be defined in accordance with the present invention.

Figure 8:
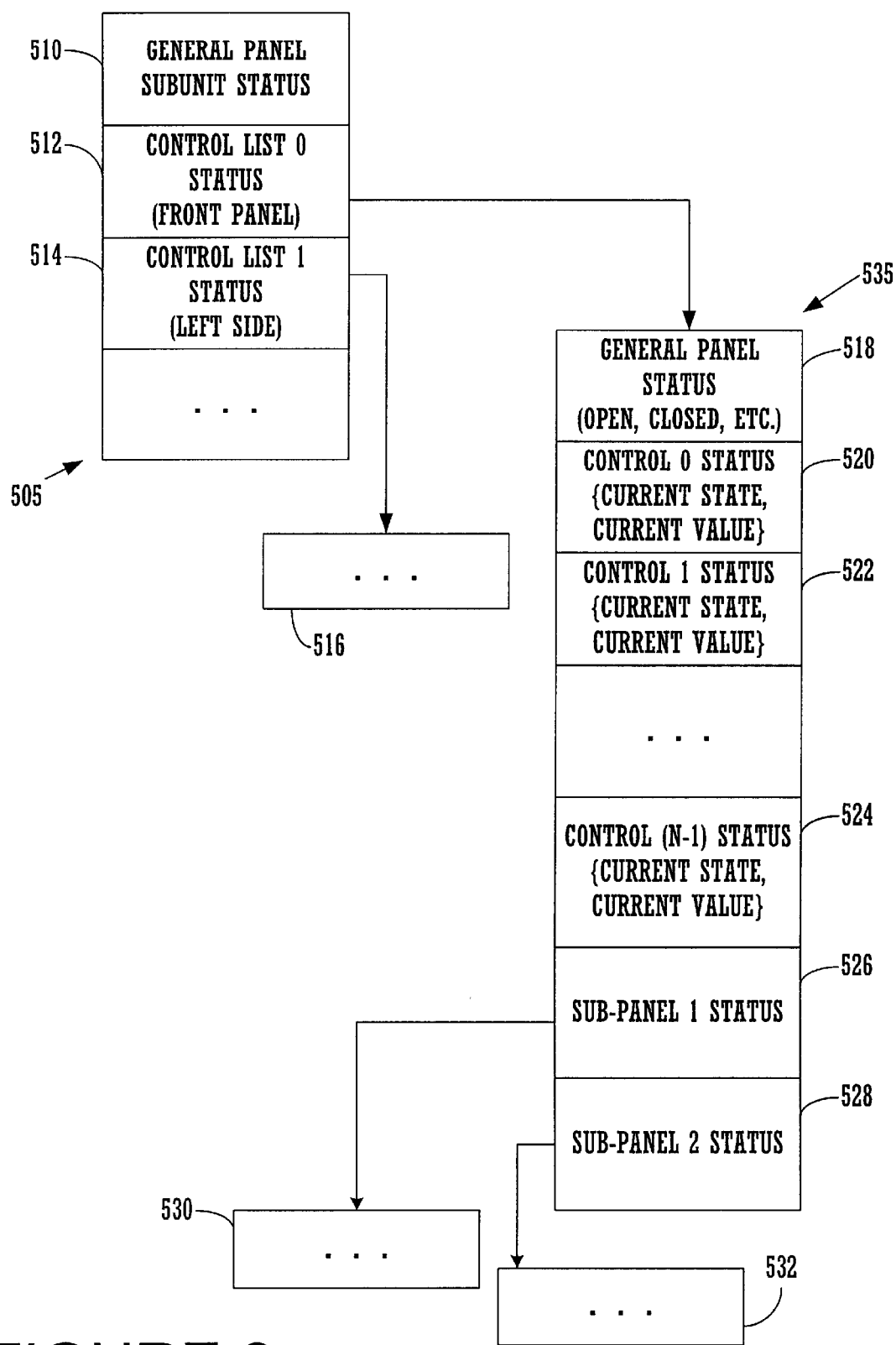
FIG. 8 illustrates a panel subunit status descriptor data structure in accordance with the present invention.

FIG. 8 illustrates a panel subunit status descriptor 500. The panel subunit 314 of the present invention also includes a panel subunit status descriptor 500 data structure. The status descriptor 500 is a data structure maintained in computer readable memory units of the target device and represents the current state of all control objects defined for a particular panel subunit in accordance with the present invention. The information maintained in the status descriptor 500 is dynamic, and is kept up-to-date by the panel subunit 314 of the present invention. Within the status descriptor 500, a separate control status field is maintained for each defined control object. When changes occur to the status descriptor 500, a notification can be forwarded to any intelligent controller that previously indicated that it was to be notified of any changes. The overall status descriptor 500 contains two main areas, one area 510 contains general status information for the panel subunit and a separate area 512 is defined for each of the control list hierarchies. Within each of these control list areas are status information for each control. Status information includes the current state of the control object (e.g., the button is currently pressed) and the current value of the control object (e.g., the LCD panel is currently displaying the text "Enter Track Name.").

In operation, an intelligent controller can request notification for individual control lists or for the general area of the panel status descriptor 500. When the status of one of these areas changes, the intelligent controller is notified. If status for an area changes for which an intelligent controller had not requested notification, the intelligent controller is not notified. This operation allows the various controllers and target devices to optimize the use of the system network bandwidth by not sending out unnecessary messages.

Status descriptor 500 of FIG. 8 is shown as an example and includes a primary status list 505 which includes a general information field 510 for panel subunit 314 and pointers 512 and 514 to other major status lists. Pointer 512 points to status list 535 for representing the status of the front panel. Status list 535 includes a status field for each control object defined for the front panel. Pointer 514 points to the status list 516 for an exemplary left side panel. Field 518 of status list 535 indicates general status information for any control objects defined with respect to the front panel including whether or not the panel is open, closed, etc. Field 520 represents the current state/value of control object 0 defined for the front panel. Likewise, field 522 represents the current state/value of control object 1 defined for the front panel.

Field 526 is a pointer to the control list 530 indicating the states/values for the control objects defined with respect to the sub-panel1 of the front panel. These control objects are defined with respect to descriptor list 356a (FIG. 5). Within status list 530, a separate control status field is defined for each control object. Field 528 of control list 535 is a pointer to the control list 532 indicating the states/values for the control objects defined with respect to the sub-panel2 of the front panel. These control objects are defined with respect to descriptor list 358a (FIG. 5). Within status list 532, a separate control status field is defined for each control object.

Figure 9:
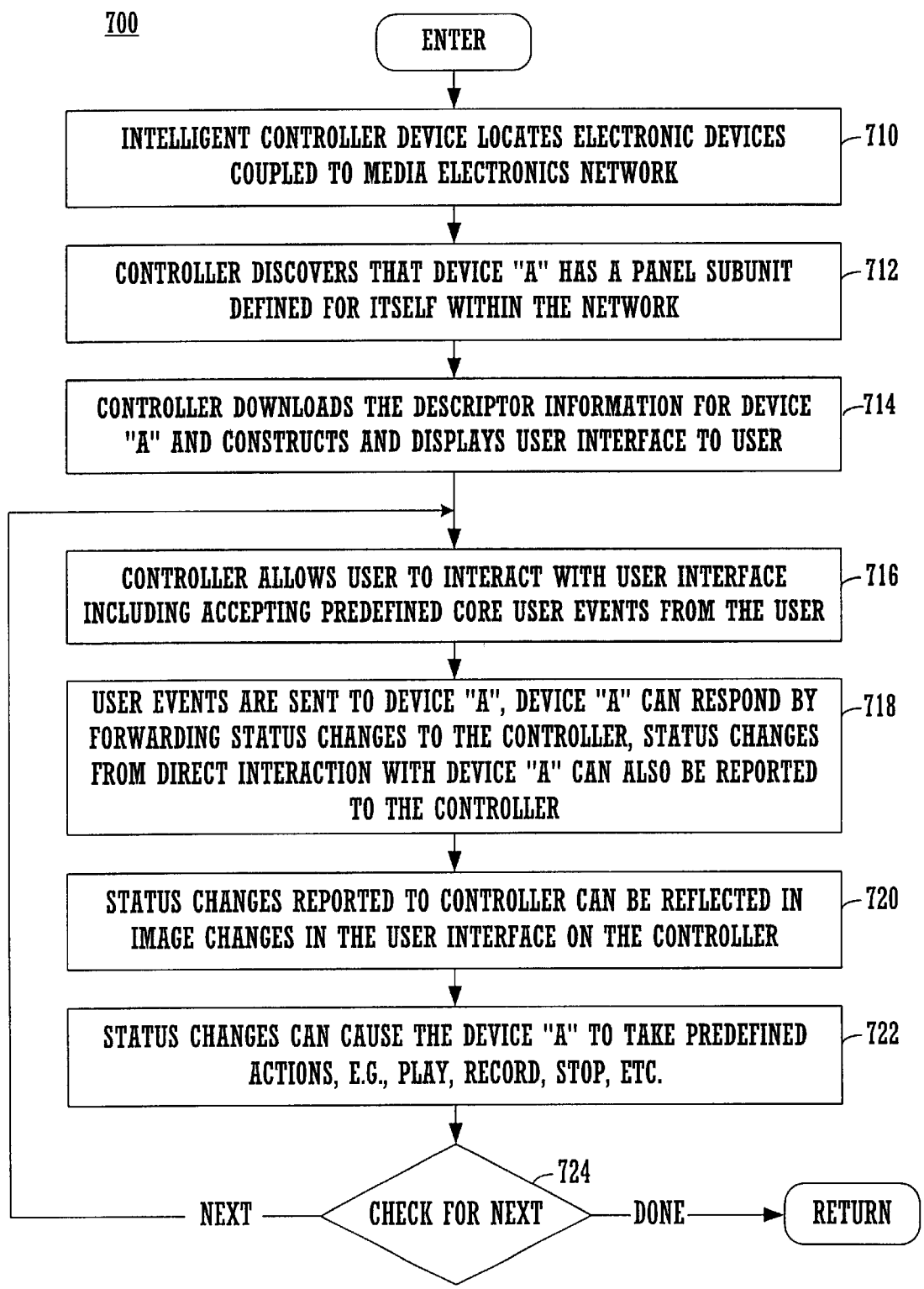
FIG. 9 is a flow diagram of steps performed by an intelligent controller in accordance with the present invention for generating a user interface.

FIG. 9 is a flow diagram illustrating steps of a process 700 implemented in accordance with the panel subunit of the present invention. Process 700 is realized as program code stored within computer readable memory units of an intelligent controller and a target device of network 5. At step 710, the intelligent controller device, e.g., STB 13 and TV 11 (used as the display unit), locates electronic devices coupled to system 5. This process utilizes well known IEEE 1394 communication protocol mechanisms. At step 712, the intelligent controller reads the computer readable memory units of a target device coupled to the network 5 and discovers that this target device has a panel subunit data structure 314 defined therein. At step 714, the intelligent controller device downloads the descriptor information and the current status descriptor table for the target device and displays a user interface on the display screen of the intelligent controller based on the downloaded information. If the intelligent controller device has limited memory resources, then the panel subunit information can be downloaded and processed in portions.

At step 714, the control objects of the panel subunit describe the look, shape, grouping and location for each user input element and each information display element for the user interface. Should the intelligent controller be limited in display capability, then text strings are displayed for the groups and/or for the control objects and these text strings can be displayed in a hierarchical format (e.g., using a tabbed-panel display).

At step 716 of FIG. 9, the intelligent controller allows the user to interact with the user interface including accepting predefined or generic user events from the user. Each control object contains an object type and each object type defines a user action that can take place with respect to the control object. For instance, buttons are "PUSHED" or "PUSHED AND HELD" or "RELEASED" and sliders and rotators can be moved to "SET A VALUE." Toggle switches can be moved between two positions, e.g., "MOVED RIGHT" or "MOVED LEFT" or "MOVED UP" or "MOVED DOWN." Other user events include setting a text value, e.g., SET TEXT VALUE, or setting a numeric value, SET VALUE, etc. These user events are defined by the control objects themselves and the intelligent controller does not interpret the meanings of these events for any target device.

At step 716, irrespective of the type of user input device, e.g., keyboard, mouse and mouse button, remote control unit, pen and stylus, light pointer, joystick, etc., the intelligent controller translates the interaction between these user input devices and the user into a generic user event core recognized by the panel subunit 314 of the present invention. For instance, a button control object can be "PRESSED" and then "RELEASED" by selecting it with a mouse or selecting it with a keyboard or with a remote control button push. In either case, the user event is "PRESSED" or "RELEASED" with respect to the control object.

At step 718 of FIG. 9, any user events detected by the intelligent controller are forwarded over the network 5 to the target device. The target device then interprets the user event and takes the appropriate action based on its programming. The programming used by the target device at step 718 is the same programming that is already present in the target device for responding to the input devices physically located on the target device. In this case, any target device having physical controls located thereon already is programmed with the required actions to take upon these controls being directly pushed by a user. The present invention takes advantage of this pre-existing functionality within each target device. A received user event may trigger a change in one or more of the states of the control objects defined within the panel subunit of the present invention. Upon a change in state, the status descriptor 500 of the panel subunit changes thereby notifying the intelligent controller of a state change.

At step 720, the intelligent controller downloads the status descriptor to determine which control object changed states. Next, the intelligent controller updates the displayed user interface to reflect the change. For instance, if the button state changed from released to pressed, then the intelligent controller may display a new image for the button state being pushed. Alternatively, if the state of the VCR tape mechanism changes from standby to play, an image within LCD panel 214 might become animated showing the tape playing, etc. At step 722, the generic user events cause the target device to implement a certain action, e.g., play, pause, etc. It is appreciated that step 722 can occur before step 720. At step 724, processing returns to step 716 to check for a next user action.

In operation, the intelligent controller is not burdened with keeping state tables or by interpreting the meaning of the user events. These interpretations are performed by the target device thereby providing the panel subunit with a large amount of flexibility for adapting to new standards and control types. Furthermore, by providing a range of possible display representations, the present invention provides a flexible user interface for intelligent controllers having robust display capabilities and also for those controllers having unsophisticated displays. The panel subunit of the present invention defines generic user input events, core data structures which define a limited set of user actions or events and display elements and a basic communication protocol is used.

Figure 10:
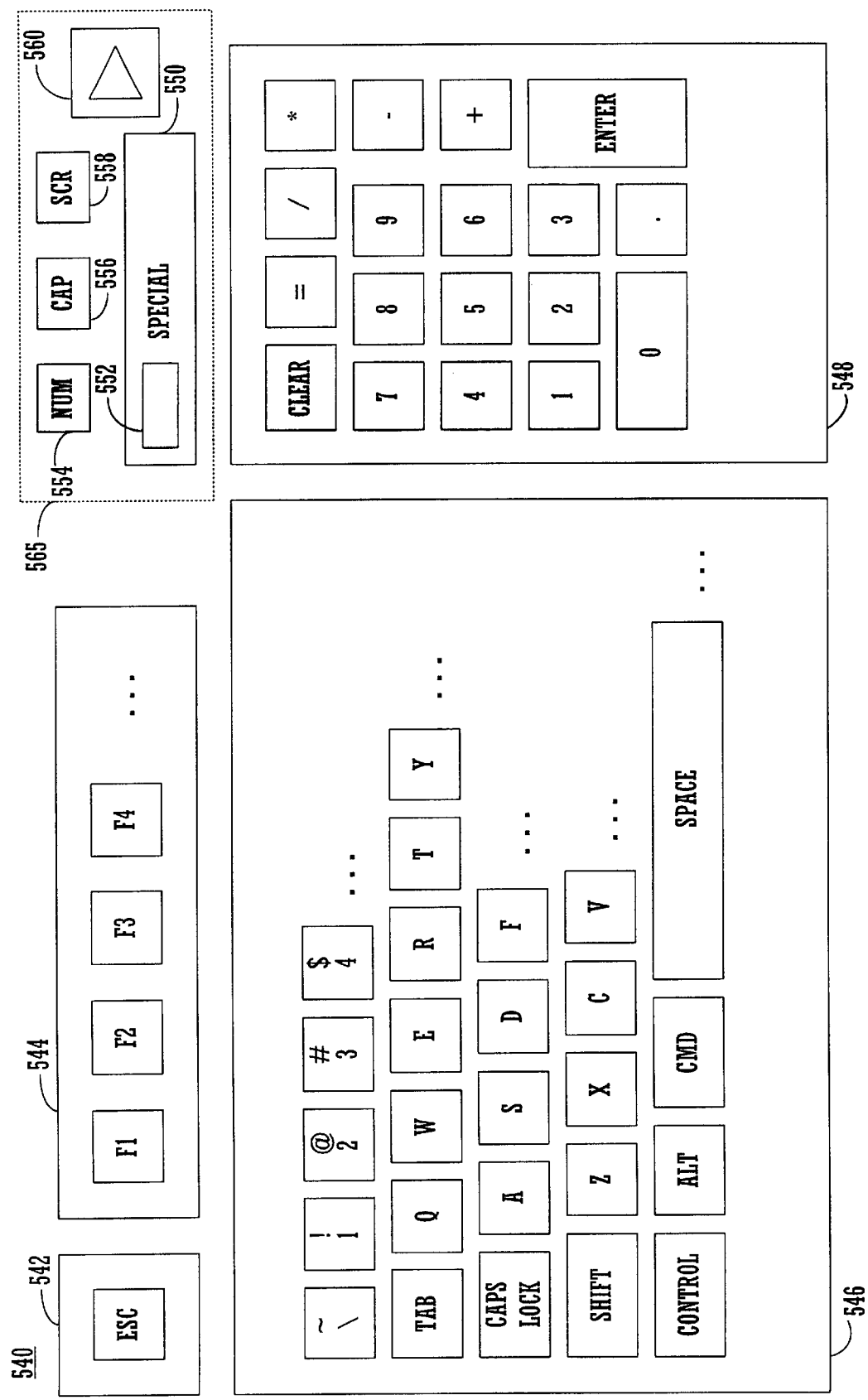
FIG. 10 illustrates an exemplary user interface displayed by the present invention based on a panel subunit and representing an on-screen keyboard.
Figure 11:
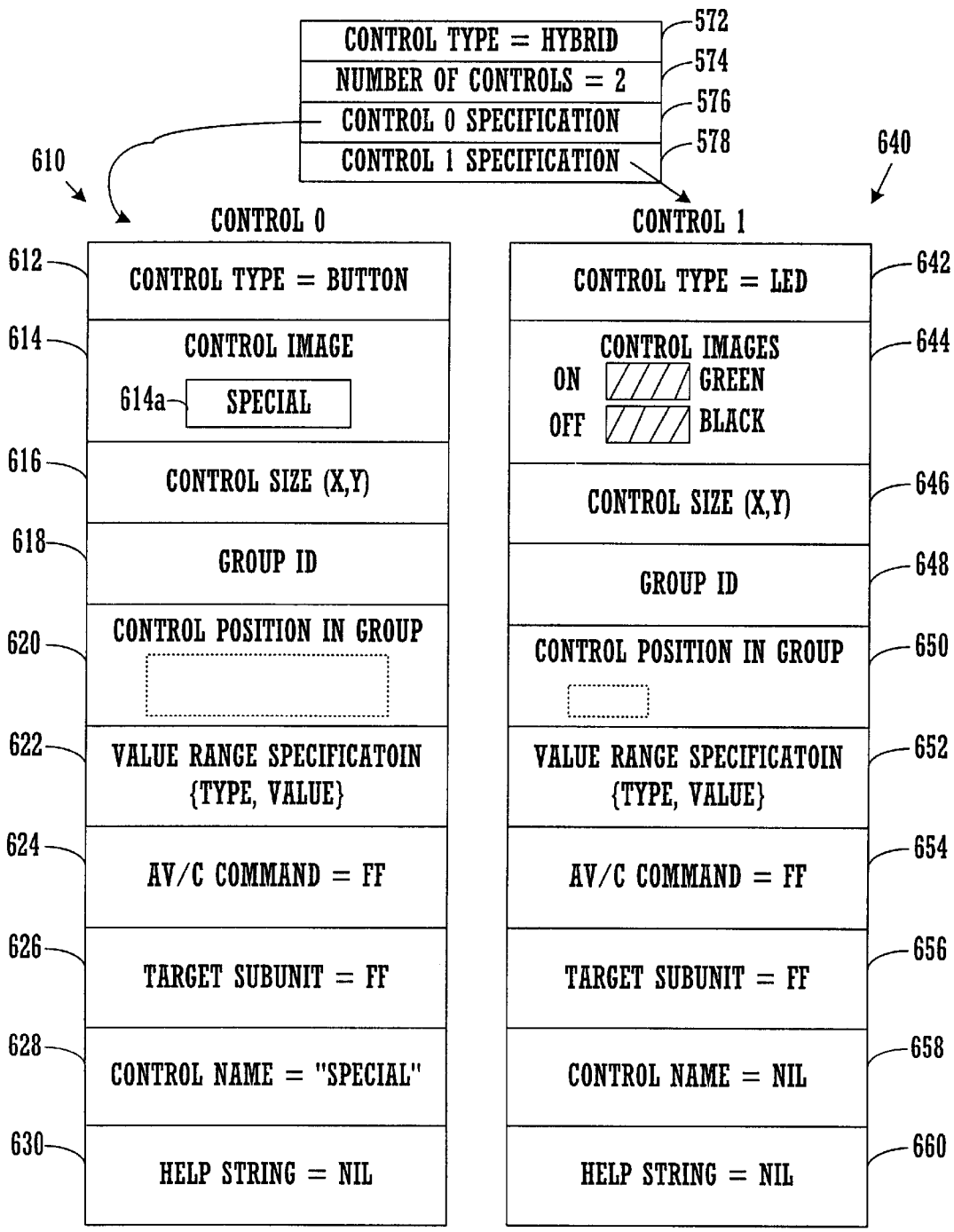
FIG. 11 illustrates exemplary panel subunit descriptor information for generating the on-screen keyboard example of FIG. 10 in accordance with the present invention.
Figure 12:
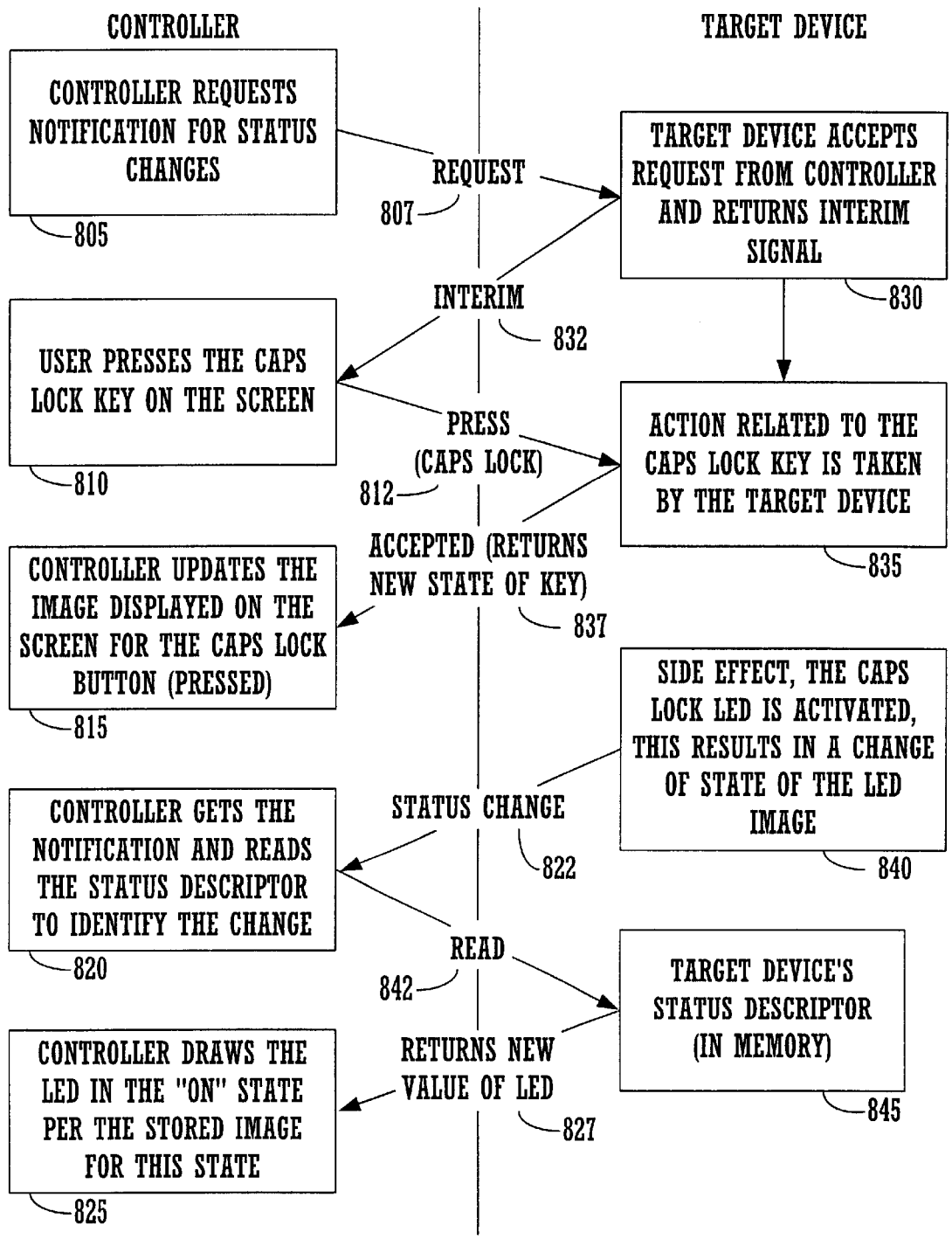
FIG. 12 illustrates exemplary steps and communications between an intelligent controller and a remote target device in accordance with the panel subunit of the present invention.

FIGS. 10–12 illustrate another example of the present invention. FIG. 10 illustrates a simulated or "virtual" keyboard 540 that can be generated for a target device using the panel subunit of the present invention. The virtual keyboard 540 can be used to control a "black box" device that itself has no physical keys or LEDs and whose control panel is purely virtual. In this case, the black box has no physical equivalent keyboard and relies on the intelligent controller for access to its functionality. In one example, the target device can be a subpanel for an intelligent television which has embedded software that requires user input, e.g., for web surfing or similar tasks.

The virtual keyboard 540 includes groups of controls where each control defines a key or an LED. Each element is represented by its own control object. The virtual keyboard 540 of FIG. 10 includes several groups (e.g., main keys, function keys, keypad keys, etc.) with various dimensions and layouts. A first group 542 includes only the ESC key while the function keys, F1–F(n), are grouped into group 544. The standard alpha keys, the tab, caps lock, shift, control, etc., keys are grouped into group 546. The numeric keys and operator keys are grouped into group 548. Also included are a numlock LED 554, a caps lock LED 556 and a scroll lock LED 558. A power on key 560 is shown along with a special button 550 having an LED 552 therein. An LED 552 embedded in the key 550 can be modeled as an LED which can be turned on or off with the appropriate panel subunit command. Thus, a key with an LED is modeled as a hybrid control object. Group 565 includes LEDs 554, 556, 558, 552 and buttons 560 and 550.

FIG. 11 illustrates the control object descriptor information within the panel subunit needed to realize the hybrid button 550 as an example in accordance with the present invention. Fields 572–578 define a control object. Field 572 indicates that the control object is a "HYBRID" type. Field 574 indicates that two control object definitions are included in this hybrid. Field 576 is a pointer to control object 610 (control0) while field 578 points to control object 640 (control1).

With respect to control0 control object 610, field 612 indicates that the object is a "button" type and field 614 indicates the button image 614a. Field 616 indicates the button dimensions (x, y) and field 618 indicates a group identifier for group 565. Field 620 indicates the relative position of button 550 within the boundary of group 565. Field 622 indicates the range of values for the button 550 (e.g., 0 and 1). Field 624 represents the optional AV/C command, if any, corresponding to the states of button 550. Field 626 is the optional target device identification. Field 628 is the string "Special" for displays that may have only text display capability. The help string, if any, is in field 630.

With respect to control1 control object 640, field 642 of FIG. 11 indicates that the object is an "LED" type and field 644 indicates the images for the different states of the LED, e.g., green for the ON state and black for the OFF state. Field 646 indicates the LED image dimensions (x, y) and field 648 indicates a group identifier for group 565. Field 650 indicates the relative position of LED 552 within the boundary of group 565. Field 652 indicates the range of values for the button 550 (e.g., ON and OFF). Field 544 represents the optional AV/C command, if any, corresponding to the states of LED 552. Field 656 is the optional target device identification. Field 658 is the string for LED 552 for displays that may have only text display capability. The help string, if any, is in field 660 Using the examples of FIG. 11, the control objects for the remainder of FIG. 10 can be realized.

FIG. 12 illustrates steps performed by the intelligent controller and the target device, and communications there between, for interacting with the virtual keyboard 540 of FIG. 10. At step 805, the intelligent controller sends a request 807 to the target device for a notification upon any changes of the status descriptor for the virtual keyboard 540. At step 830, the target device accepts the request 807 and generates an interim signal 832 to the intelligent controller acknowledging the request 807. At step 810, the user interfaces with the virtual keyboard 540 such that the user event "PRESS" is indicated on the caps lock key of group 546. The user event "PRESS" caps lock is then transmitted 812 from the intelligent controller to step 835 of the target device.

At step 835, the target device takes any action required by this user event according to its own preset programming. The status descriptor changes and this causes a status response (e.g., to the PRESS command) to be generated by the target device. At step 835, the target device forwards a new status 837 of the caps lock key to the intelligent controller indicating that the caps lock key is now pressed. Only after receiving the new status information 837 does the intelligent controller change the image of the caps lock button on the display to indicate that it is now pressed. As a side effect of the action taken by the target device, at step 840, the state of the caps lock LED 556 changes from OFF to ON. The status descriptor changes and this causes a status update message to be generated by the target device. This change in status is reported by message 822 to the intelligent controller in response to a change in the status descriptor. The intelligent controller, in response to message 822, reads the status descriptor 845 of the target device to determine which control object changed status. At 827, it is determined and returned that the status of the LED 556 changed from OFF to ON. Only in response to receiving the new status information does the intelligent controller, at step 825, then update the image for the LED 556 from black to green to indicate the new status of ON.

It is appreciated that a direct interaction with the physical controls of the target device at step 840 can also cause a state change in the status descriptor which would then cause a notification of a status change to be forwarded to the intelligent controller. This action would also cause a change in the user interface displayed on the intelligent controller as described above The process can be repeated.

One embodiment of the present invention describes the representation of device capabilities which have some types of physical control or display, e.g., something that is user-visible and that would be manipulated by a human. However, the panel subunit of the present invention can be extended to describe how to access functionality that is "built-in" to a device but which does not have a physical external button to access it. For example, many digital set-top-boxes can contain on e or more MPEG2 decoders, which contain very useful media processing functions. However, it is very unlikely that there would be an MPEG2 button on the device for the user to push. Rather, the panel subunit of the present invention can be used to define interface objects within a descriptor that represent "virtual" buttons and dials for interfacing with the MPEG2 decoder. Therefore, the capabilities of the MPEG2 decoder and the means to access its capabilities can be described using the present invention even though no physical interface elements exist on the set-top-box.

In furtherance of the above, because the panel subunit 314 of the present invention defines various types of controls and their attributes, it is possible for a "black box" device to be built which has no physical controls, but relies on its panel subunit of the present invention as its only means of being controlled (e.g., the virtual keyboard 540). Such a target device might be designed for situations where the hardware can be located in a remote or hidden location and the user control center (e.g., the intelligent controller) is at a different location. In this case, the target device would not have physical controls on its surface because they would never be used directly by a person.

Another embodiment of the present invention is drawn to the types of information or attributes that are provided by the functionality descriptors of the panel subunit. For example, the present invention describes various attributes for a button control including its physical appearance, size and shape, a text string describing the function, e.g., "play," possibly a help string describing how to use it, and some standard commands for manipulating that control, e.g., PUSH BUTTON or SET BUTTON VALUE TO 1. A variation of this functionality can add some other attributes that may be useful either in a general way or a vender-specific way.

EXACT IMAGE TRANSFER MECHANISM WITH PANEL SUBUNIT

Although the panel subunit mechanism allows a target device to communicate information to a controller, the controller is allowed reorder the elements displayed on its screen to accommodate other limitations, e.g., screen size, etc. If a controller does not have the ability to display a rich interface, it may alter the order and appearance of the interface elements ("objects") in order to accommodate its display capability. As such, a target device using only the panel subunit as described above, has no guarantee that its interface elements will be displayed in any prescribed order as specified by the target. However, the exact image transfer mechanism of this embodiment of the present invention provides a way for a target to have screen information displayed on a controller without the controller rearranging or reordering any of the screen elements. This is particularly useful in cases where the screen ordering or arrangement is key for the user to understand the information that is displayed. One example of this in the case of electronic program guides (EPGs) where vertically aligned and horizontally aligned information carries meaning within the guide. In other cases, the appearances of the objects are also important to maintain in addition to their screen order.

Figure 13:
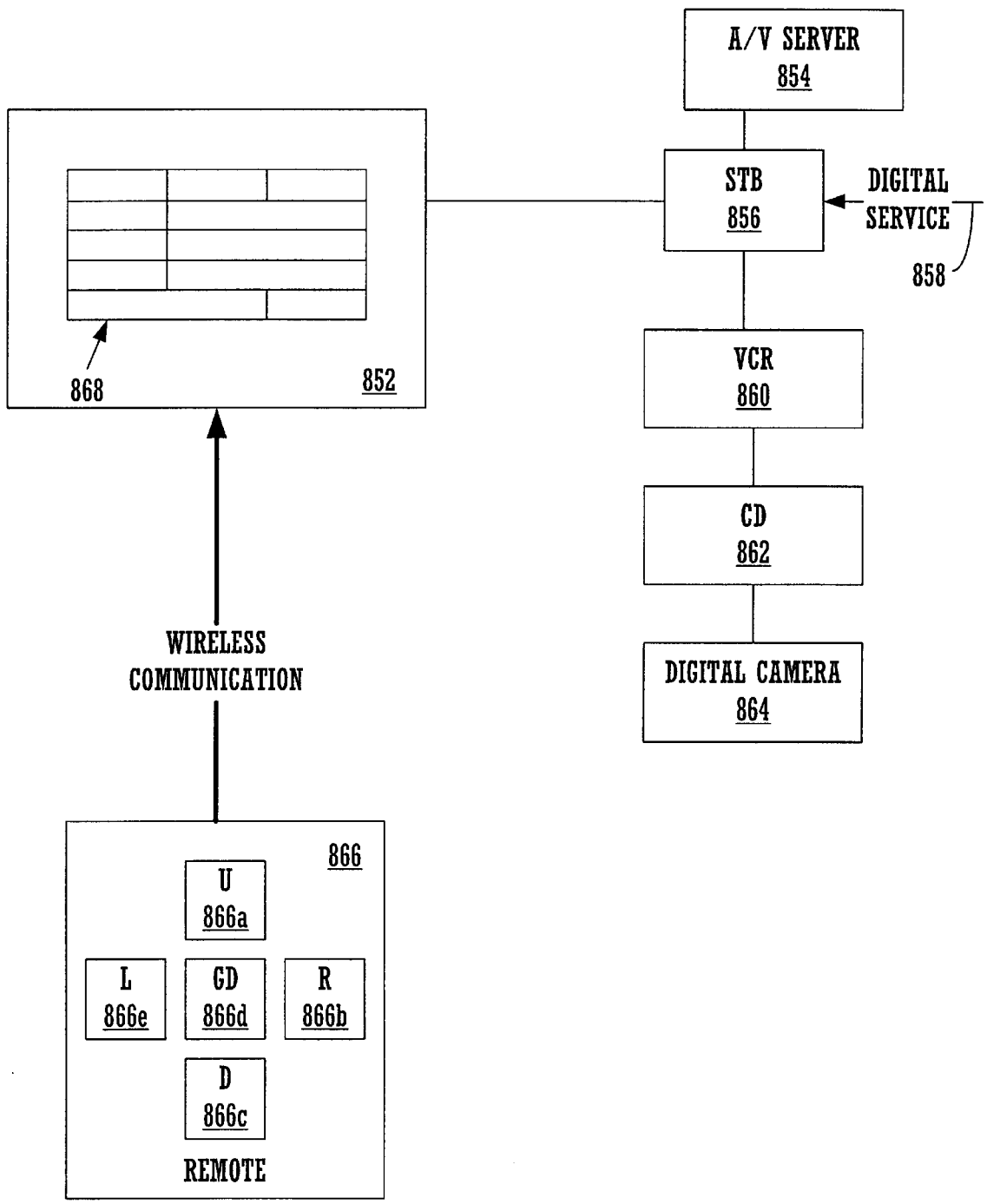
FIG. 13 illustrates an electronic network in which the exact image transfer embodiment and the root panel list embodiment of the present invention may be practiced.

FIG. 13 illustrates an exemplary network 850 of electronic devices that can make use of the exact image transfer mechanism of the present invention. This exemplary network 850 (connected via a high speed bus, e.g., the IEEE 1394 bus) contains a controller device 852 (e.g., digital television unit) coupled to set-top-box device 856 (the "target"). The STB 856 receives a cable input 858. Other devices within the exemplary network 850 include an audio/ video server disk 854, a VCR 860, a CD 862 and a digital camera 864. To implement the present invention, only the target 856 and the controller 852 are required. The controller 852, in this case, includes a remote control unit 866 which contains special function keys, such as, a guide button 866a, a selection up button 866a, a selection down button 866c, a selection right button 866b and a selection left button 866e. Buttons 866a–866c and 866e are used to alter the focus of a displayed image during user navigation. Focus refers to a highlighted or otherwise distinguished screen object. When pressed, the guide button 866d causes an EPG 868 to appear on the controller screen 852.

Figure 14:
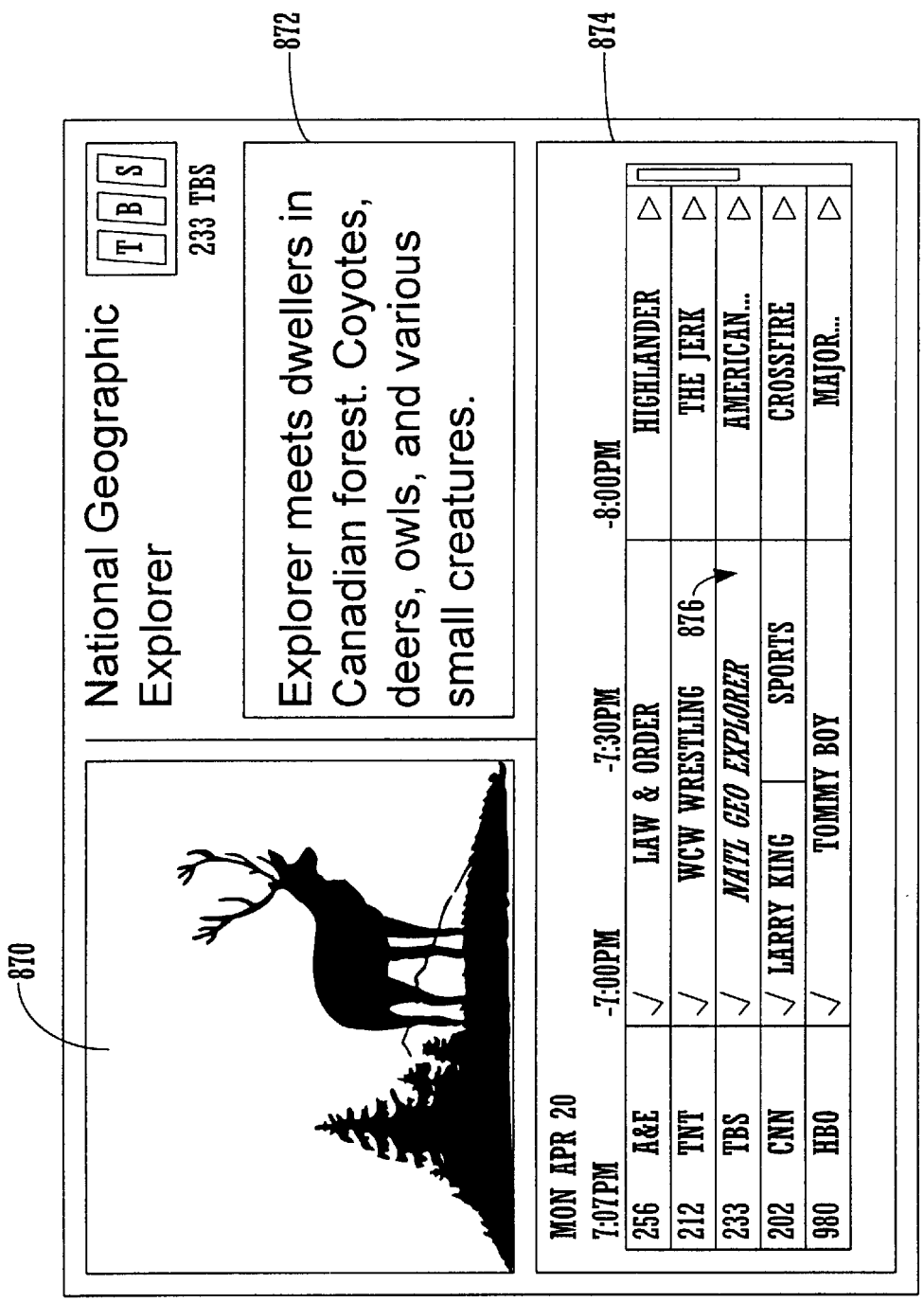
FIG. 14 is a depiction of an exemplary electronic program guide (EPG) displayed by a controller device in accordance with an embodiment of the present invention.

FIG. 14 illustrates an exemplary EPG 868 in more detail. The information contains vertically and horizontally aligned information 874 (a "matrix") representing programs, their display times and which stations carry the programming. For instance, the display time is aligned along the horizontal and the station (or content provider) information is aligned along the vertical. A particular selected program 876 is also shown highlighted. Each separate display item can be considered an object. Also shown in FIG. 14, but optional, is an analog video image 870 of the selected program 876 and a text description 872 of the selected program 876. Assuming each element of the EPG matrix 874 is a button within the panel subunit descriptor, the buttons should be displayed by the controller 868 with the particular order shown in FIG. 14, otherwise the EPG will not make any sense to a user. This is a case where the arrangement of the buttons carries meaning to the user and therefore the target device wants this ordering maintained by the controller when displayed to the user. There are also other cases where the appearances of each element (button) is also important.

However, in the panel subunit, the controller may alter the attribute of the element depending on its screen limitations. As described below, the present invention provides an exact image transfer mechanism to allow the target to guarantee a particular display order and attribute appearance by the controller. Not only may the panel subunit rearrange the button ordering in an EPG display, it also requires a fair amount of complexity to implement the EPG display. For instance, using the panel subunit, many separate elements and considerable complexity are required to generate the similar display as shown in FIG. 14. Some controller devices are not able to process this level of complexity. As described below, the present invention provides the exact image transfer mechanism to allow a simple controller to display EPG information from the target.

Moreover, the special keys located on the remote control device (FIG. 13) may not have any corresponding button displayed on the controller, as shown in FIG. 14. In this case, the controller does not have a mechanism, under the panel subunit as described above, to communicate these commands to the target device. As described below, the present invention also provides a command pass-through mechanism allowing a set of pre-defined user command codes to be passed directly to the target device.

Figure 15A:
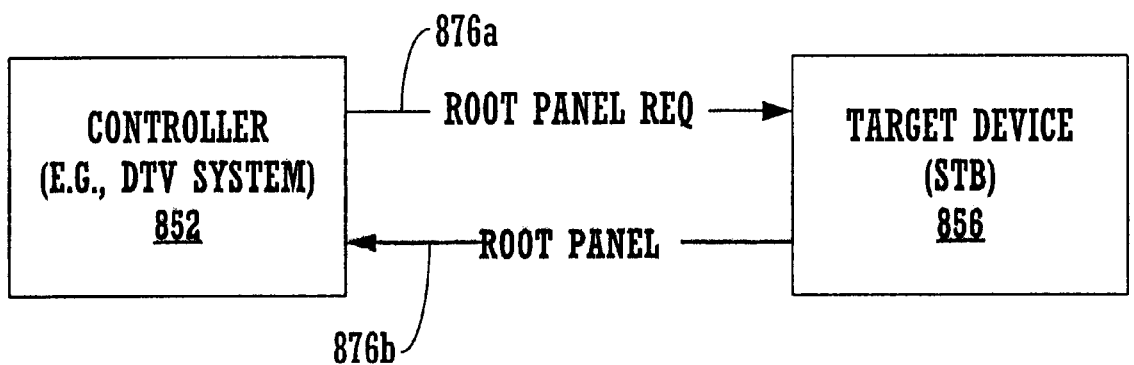
FIGS. 15A, 15B, 15C, 15D, 15E, 15F and 15G represent data flow between a controller and a target in accordance with the exact image transfer mechanism of the present invention.

FIGS. 15A–15G illustrate exemplary data flow between a controller 852 and a target device 856 in accordance with the exact image transfer mechanism of the present invention. In this embodiment, the target is responsible to transfer a bitmap image to the controller which is then displayed by the controller without modification. In this way, the elements of the bitmap are displayed in the exact order and with the exact attributes as specified by the target. FIG. 15A illustrates, by data flow 876a, the controller 852 requesting or reading root panel information. Root panel information, as described more fully below, is sent to the controller (as shown by data flow 876b) and lists the basic capabilities of the target 856 and may include entries for rendering panels on the controller's screen. The root panel information may also specify if command pass-through is available.

Figure 15B:
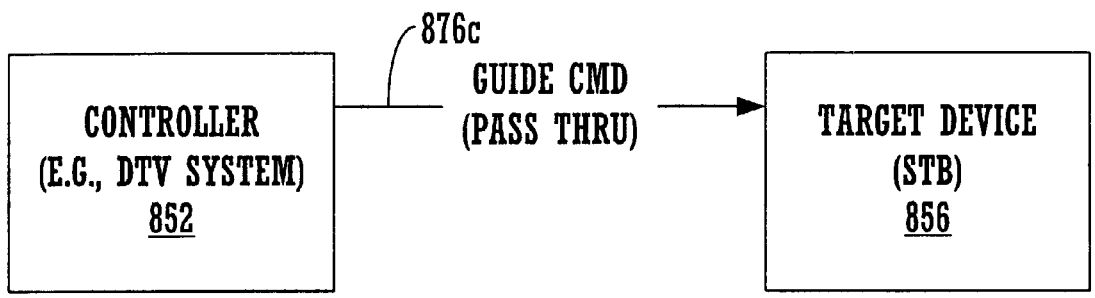

As shown by FIG. 15B, in response to a user selecting the "GUIDE" button 866d (FIG. 13) on a remote control device 866, for instance, a command pass-through code 876c is forwarded to the target 856 (e.g., using the 1394 asynchronous connection) which recognizes this command as a request for the display of EPG information. It is appreciated that any of a number of different mechanisms can be used to signal a request for EPG information and the command pass-through mechanism shown in FIG. 15B is just one example.

Figure 15C:
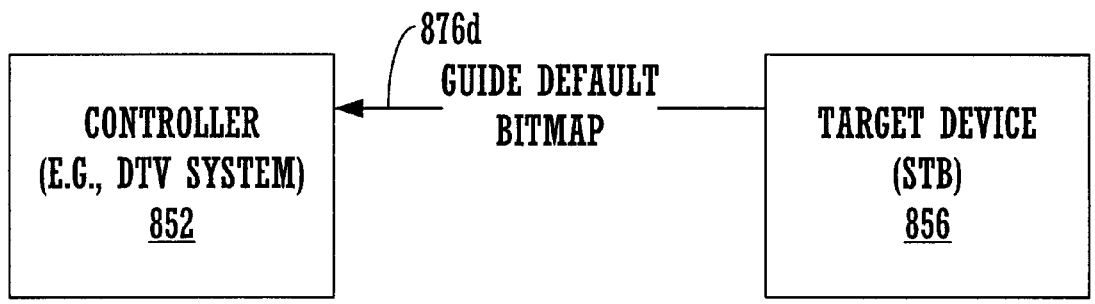

As shown in FIG. 15C, the target 856 then forwards the controller an initial bitmap image (as shown by data flow 876a) of EPG information which is displayed on a screen of the controller 852. The initial bitmap image 874 has a default focus selection and is shown in FIG. 16A. The default focus selection ("default focus") is 876, "National Geographic." It is appreciated that the entire matrix shown in 16A including the highlighted default selection 876 is contained in a single bitmap image that is forwarded from the target 856 for display by the controller 852. In this way, the arrangement of the buttons in the matrix and their appearances are guaranteed to be displayed (by the controller) in the order and with the attributes selected by the target 856.

Figure 15D:
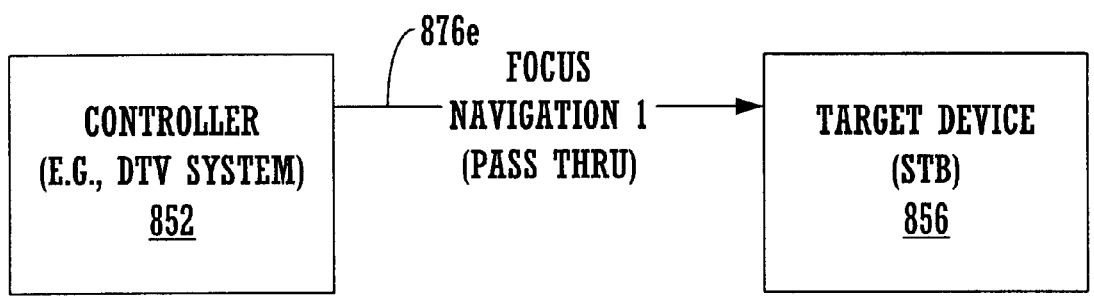
Figure 15E:
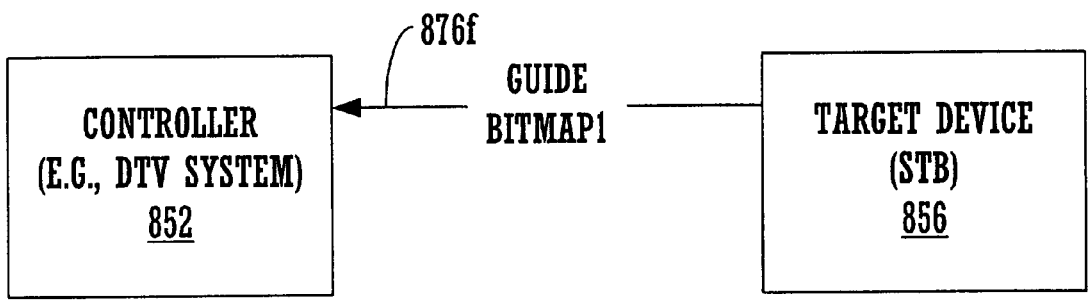

As shown in FIG. 15D, the user then selects a focus navigation change, e.g., selection of the up button 866a (FIG. 13). This causes a focus navigation pass through command 876e to be communicated to the target device 856. It is appreciated that a number of different mechanisms can be used to communicate a focus navigation change to the target 856 and the command pass through mechanism shown in FIG. 15D is just one example. In response to the focus navigation change, the target device 856 then compiles a new guide bitmap image (guide bitmap1) illustrating a new selected program, "WCW Wrestling," based on the navigation. FIG. 15E illustrates at 876f that the new guide bitmap1 is then communicated to the controller 872 and displayed thereon. FIG. 16B illustrates the new guide bitmap 880 with the newly selected program or "focus" is now object 882. It is appreciated that the entire matrix shown in 16B including the highlighted default selection 882 is contained in a single bitmap image that is forwarded from the target 856 for display by the controller 852.

Figure 15F:
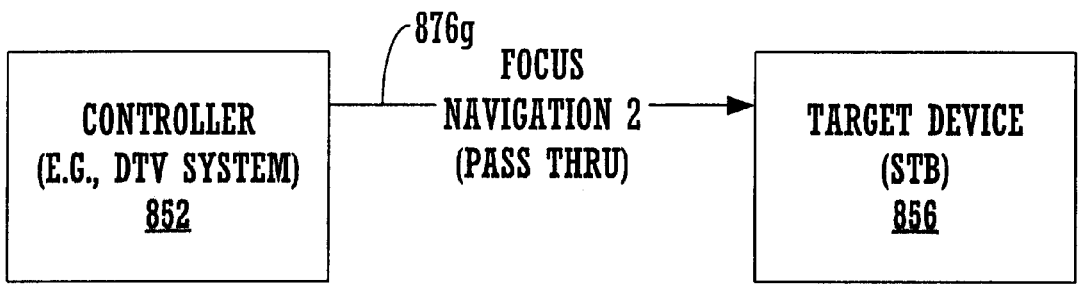
Figure 15G:
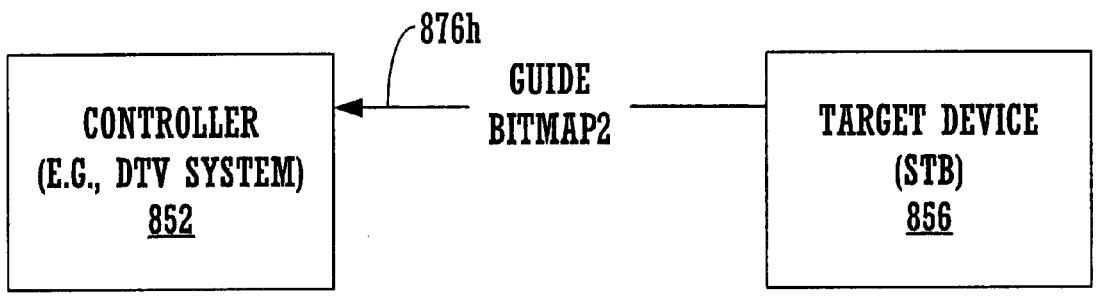

As shown in FIG. 15F, the user then selects another focus navigation change, e.g., selection of the right button 866b (FIG. 13). This causes a focus navigation pass through command 876g to be communicated to the target device 856. It is appreciated that a number of different mechanisms can be used to communicate a focus navigation change to the target 856 and the command pass through mechanism shown in FIG. 15F is just one example. In response to the focus navigation change, the target device 856 then compiles a new guide bitmap image (guide bitmap2) illustrating a new selected program, "The Jerk," based on the navigation. FIG. 15G illustrates at 876h that the new guide bitmap2 is then communicated to the controller 872 and display thereon. FIG. 16C illustrates the new guide bitmap 884 with the newly selected program or "focus" is now object 886. It is appreciated that the entire matrix shown in 16C including the highlighted default selection 886 is contained in a single bitmap image that is forwarded from the target 856 for display by the controller 852.

Figure 17:
FIG. 17 is a flow diagram of a process representing an embodiment of the exact image transfer mechanism of the present invention.

FIG. 17 illustrates a flow diagram 900 of steps performed within the electronic network 850 for implementing the exact image transfer mechanism within the panel subunit architecture. At step 902, the target generates and stores a default bitmap display having a particular arrangement of objects and object attributes. In one implementation, this an initial guide bitmap having a default focus selection. In response to a user selection, the target sends the default bitmap to the controller. In one example, the user selection is the pressing of a real or virtual (e.g., on-screen) guide button. At step 906, the controller then displays the received bitmap on its display screen. In the given example, the controller, a DTV unit, displays the EPG information to a user. By displaying the bitmap image, the exact arrangement and appearance of the buttons, as dictated by the target, is maintained by the controller.

At step 908, the user interfaces with the display EPG information by providing a focus navigation change. In one implementation, this occurs by the pressing of a defined focus navigation button (e.g., arrow up, arrow down, arrow right or arrow left). The navigation tool can be located on the DTV unit, or on a remote control device, or it could be virtual (e.g., on screen displayed). At step 910, the user selection is communicated to the target device. In one implementation, step 910 is realized using the command pass-through mechanism. In an alternate embodiment, the panel subunit communication architecture as described with respect to FIGS. 1–12, is used. Specifically, a user event within the panel subunit can be used to realize step 910.

At step 912 of FIG. 17, the present invention then causes the target device to create a new bitmap image based on the user selection received at step 910. In one implementation, a new focus selection is highlighted based on the user selection and this new EPG data is represented as a bitmap image. At step 914, the new bitmap image is then communicated to the controller. Step 906 is then entered again for displaying the new bitmap data. As stated above, by displaying the bitmap image, the exact arrangement and appearance of the buttons, as dictated by the target, is maintained by the controller. It is appreciated that by receiving one bitmap image representing the EPG display, the controller can readily present the image on a display screen without needing to compile a complex list of objects or elements that would otherwise be required under the panel subunit architecture.

It is appreciated that by using the exact image transfer mechanism, the present invention provides an efficient way for a target device to communicate a screen of information for display on a controller where the controller is not able to alter the screen arrangement or object attributes. It is particularly advantageous for the display of information that needs to be displayed in a particular arrangement (e.g., EPG information) and also when used in conjunction with controllers that do not have robust processing capabilities and may not implement the full complement of panel subunit functionality. Such controller devices are economical and do have advantageous time-to-market qualities. In these cases, the entire bitmap image is sent from the target to the controller and the controller can readily display the information without implementing all of the other panel subunit functionalities.

ROOT PANEL LIST MECHANISM WITH PANEL SUBUNIT

An embodiment of the present invention also includes the root panel list mechanism that can be implemented within the panel subunit. The root panel list, maintained by the target device, contains entries of panels that represent the basic functionality of the target device. Generally, the root panel list includes all the other panels of the target device's panel subunit. Once read by the controller, the root panel list provides a short cut mechanism for displaying a root panel display on the controller. The controller can display the root panel without decoding complex element data as required in the panel subunit. The root panel list is also a short cut method in that the controller can generate the corresponding root panel display, e.g., in response to a user selection, without further communication with the target device once the target's root panel list is read. Within the root panel list, the target can also specify the particular attributes for displaying the entries within the root panel display. The controller can use the root panel list to identify the functionality of the target and prepare the panel in a suitable way which depends on the target's capabilities. The root panel list can also indicate whether or not the root panel or entries in the list are activated using the command pass-through mechanism.

Figure 18:
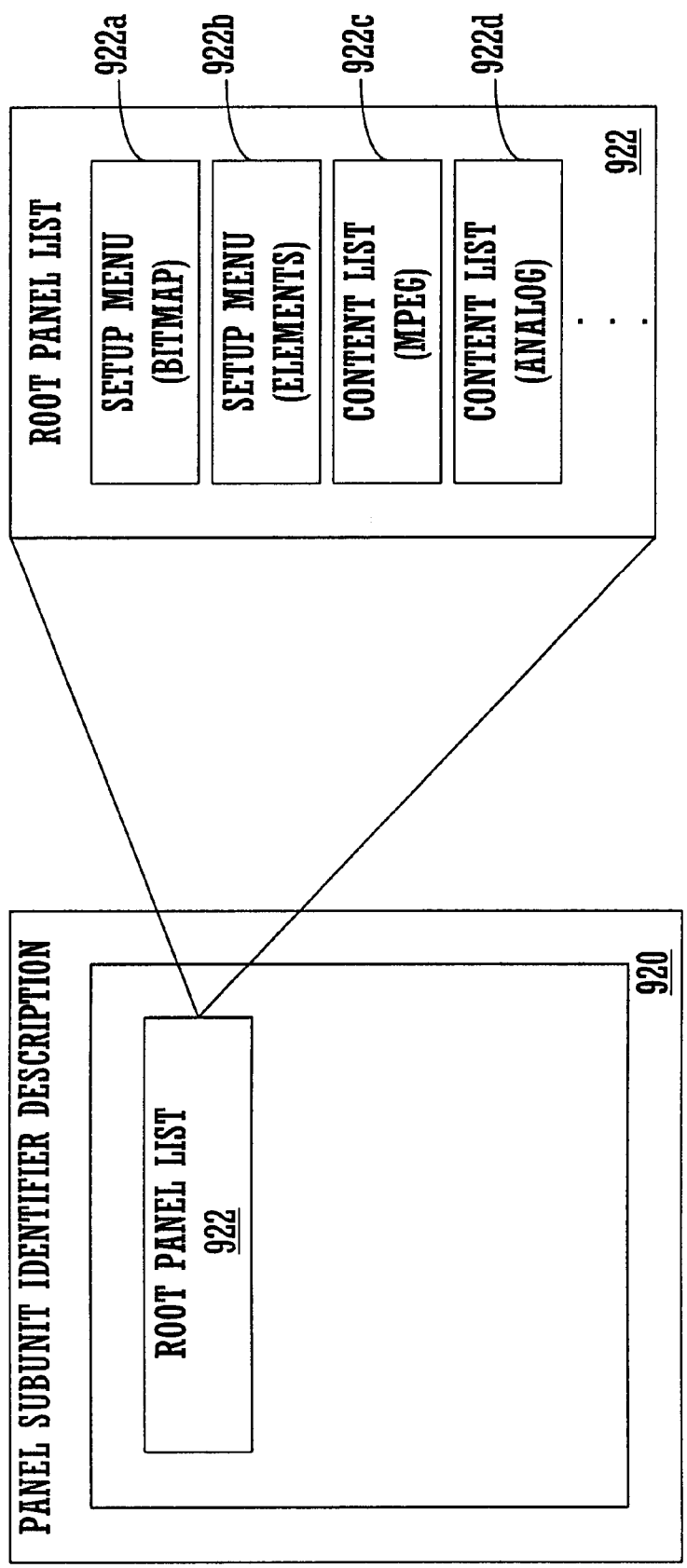
FIG. 18 is a diagram of the components of the root panel list embodiment of the present invention.

FIG. 18 illustrates that the root panel list 922 can be implemented within the panel subunit framework 920 and, specifically, it can be implemented as an extension to the panel subunit identifier descriptor (as described above). The root panel list 922 contains entries that each relate to a particular functionality performed by the target and which can be selected by a user. Each entry also contains a panel type, e.g., bitmap, analog video, elements, etc. The panel type defines the display format of the entry. In the example of FIG. 18, the root panel list contains a setup menu entry 922a (bitmap), another setup menu entry 922b (elements), a content list entry 922c (MPEG), and another contents list entry 922d (analog video), etc. The bitmap type indicates that the entry is to be displayed using a bitmap display format. The elements type indicates that the entry is to be displayed using panel subunit elements, as described above. The analog video type indicates that the entry is to be displayed using analog video.

As shown in FIG. 19A and FIG. 19B, the controller 852, once reading the root panel list 922, can itself generate (at any time) the root panel 930 on its display screen. In the example of FIG. 19A and FIG. 19B, the target device is a digital satellite service (DSS) tuner and the controller is a digital TV. In one embodiment, the controller 852 can determine the best display arrangement and format for presenting the root panel display 930. In the example shown in FIG. 19B, a 3×2 matrix is selected for displaying a setup1 panel 930a, a setup2 panel 930b, a content1 panel 930c, a content2 panel 930d and other panels 930e and 930f. The content refers to audio/video content from the DSS. Panels 930a–930d correspond, respectively, to entries 922a–922d of the root panel list 922 of FIG. 19A.

It is appreciated that the rendering of the root panel display 930 can be initiated by a number of controller activities, including a user input. Once initiated, and after having read the root panel list 922, the controller 852 can render the root panel display 930 without any communication with the target device. In one embodiment, the controller 852 can contain a short cut software implementation that when activated, directly generates the root panel display 930. In one example, this can be done in response to a user pressing a particular key (e.g., "control panel" key) on a remote device 866 or on the controller directly or by pressing a virtual key or button rendered on a screen.

Figure 20:
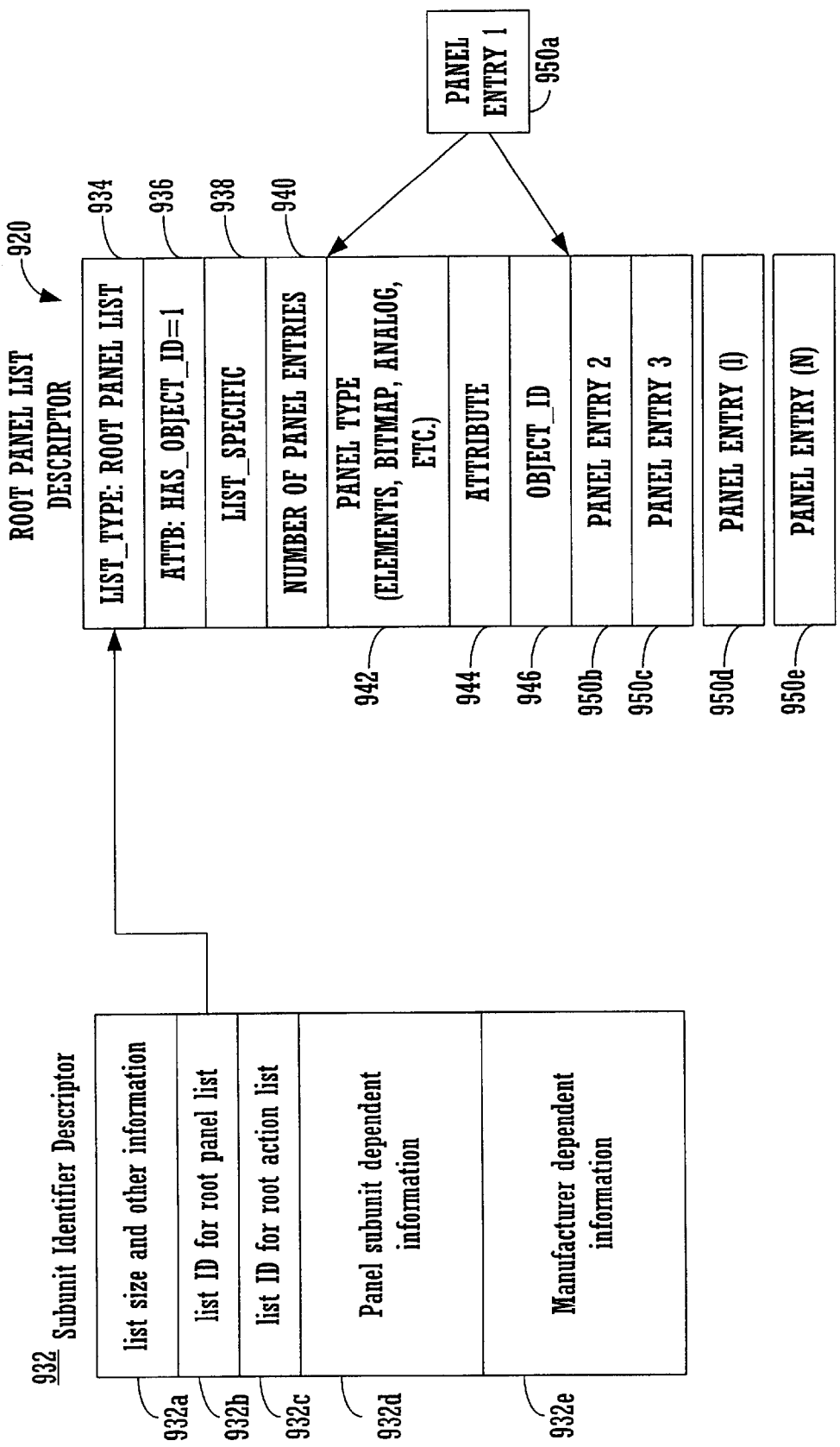
FIG. 20 illustrates the root panel list descriptor in accordance with an embodiment of the present invention.

FIG. 20 illustrates a particular implementation of the root panel list in accordance with the present invention. In this example, the root panel list is an extension to the panel subunit identifier descriptor 932. A panel subunit identifier descriptor 932 is shown containing entries 932a–932e. Entry 932a indicates the root panel list size and other optional information. Entry 932b is a list identifier that can be used as a pointer to the root panel list descriptor 920. Entry 932c is an identifier that can be used as a pointer to a root panel descriptor that indicates an action list. The action list can identify the action taken which invokes the root panel or its entries. In one implementation, normal user events as defined within the panel subunit can invoke the root panel list and its entries. In another embodiment, the command pass-through mechanism can invoke the root panel list and its entries. This type of information is defined within the action list. Optional entries 932d and 932e contain panel subunit dependent information and manufacturer dependent information, respectively.

Entry 934 of the root panel list descriptor 920 contains list type information and specifically indicates that data structure 920 is a root panel list. Entry 936 carries information regarding the display attribute information pertinent to the entire root panel display. Entry 938 contains list specific information pertinent to the root panel list descriptor 920. List specific information 938 may also contain command pass-through information indicating that the controller should generate the root panel display whenever a particular predefined user code is selected, e.g., from remote control device 866.

The root panel list descriptor 920 also contains a number of entries 950a–950e, each corresponding to a panel of the root panel display. Entry 940 indicates the number of these entries defined. Entry1 950a is expanded to illustrate the definition of each entry which contains a panel type field, an attribute field and an object identifier field. Each entry contains a panel type identifier field 942, e.g., elements, bitmap, analog, etc. This code indicates the display type of the panel. If the type of bitmap, then the corresponding panel is a bitmap image. If the type of elements, then the corresponding panel is created using the element definitions as found in the panel subunit description. If the type is analog, then the corresponding panel is to be displayed using an analog video clip (e.g., decimated video). Other panel types can also be used. The attribute field 944 indicates a particular display attribute to be used with the corresponding panel. Attribute information may define size information, color information, filter information, display priority information, default display characteristics, etc. Field 946 indicates an object identifier that can be used to associate a particular pass-through command with the entry. The object identifier can also be used as a pointer for indicating where to locate the associated element definition, bitmap image or analog video store. It is appreciated that each entry of the remainder entries 950b–950e also contains respective panel type, attribute and object identifier fields.

FIG. 21 illustrates a data structured used by the present invention for providing the analog video panel type (also called decimated video). For transferring decimated video to the screen, the controller defines the following fields for a the video window accepting the decimated video. Field 952a indicates the starting x coordinate position and field 952b indicates the starting y coordinate position. Field 952c indicates the width of the video window and field 952d indicates the height of the video window. Field 952e indicates the channel number where the video is located within the transport stream.

Figure 22:
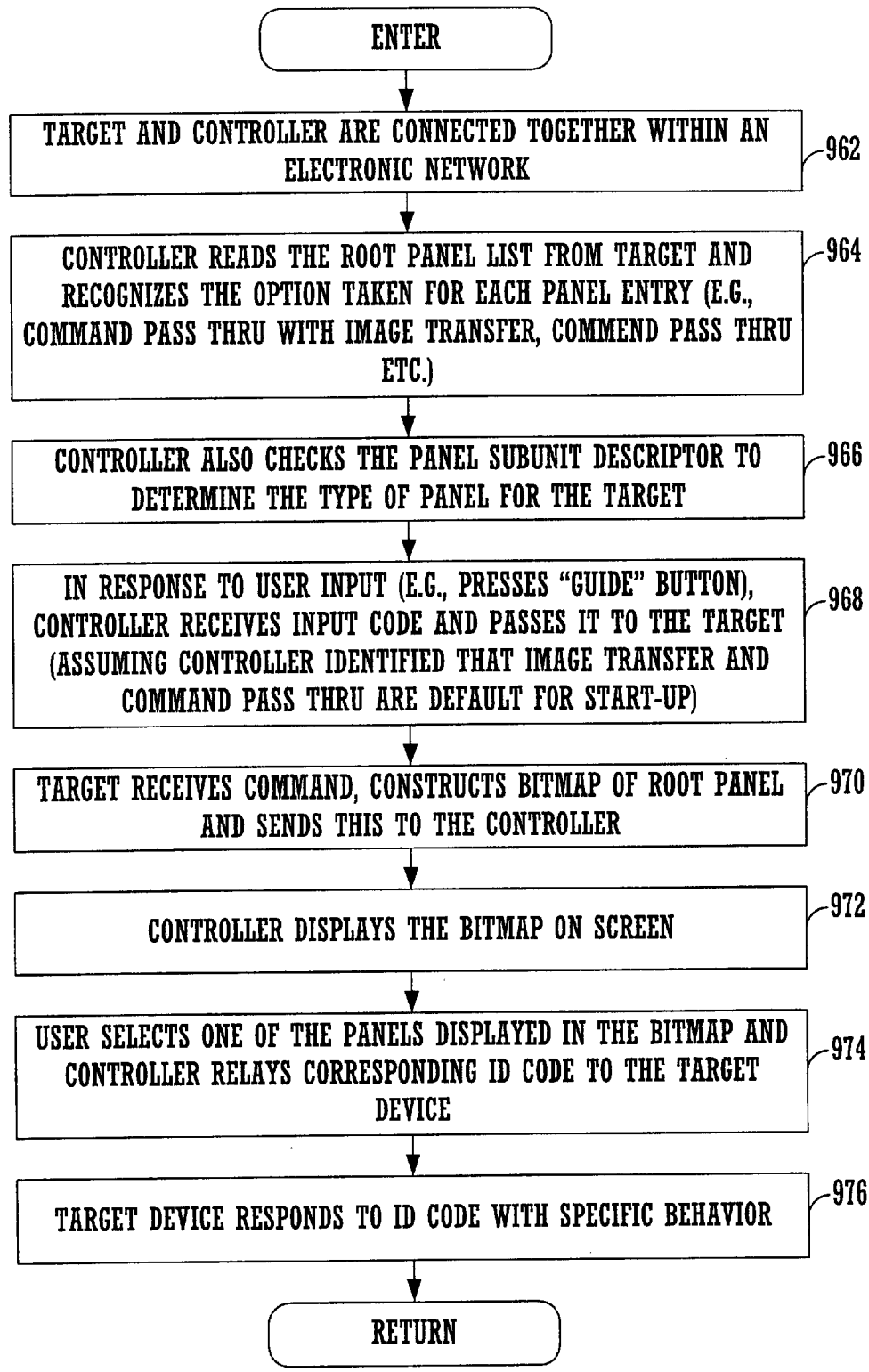
FIG. 22 is a process used by the present invention employing root panel lists within a panel subunit mechanism.

FIG. 22 illustrates a flow diagram 960 of steps performed in accordance with an embodiment of the present invention used in an environment where the target device constructs the root panel display and FIG. 23 illustrates the example where the controller generates and displays the root panel display. At step 962 of FIG. 22, the target and the controller devices are connected together within an electronic network. The controller then reads the root panel list descriptor from the within the target device and identifies the target's functionality and also recognizes the option selected for invoking each function (entry). For instance, is exact image transfer used to display the entry, is command pass-through used for each entry, etc. At step 932, the controller then checks the panel subunit identifier descriptor 932 (FIG. 20) to determine the type of root panel list for the target. In this case, the panel subunit identifier descriptor 932 will indicate that the root panel display is bitmap and that the target will generate it for the controller, much in the same way the EPG information is processed in the exact image transfer mechanism described above. Also, the panel subunit identifier descriptor 932 can also indicate that command pass-through is used to invoke the root panel display.

At step 968 of FIG. 22, in response to a user input, e.g., a press of the guide or "control panel" button on remote device 866 or on the controller or on a virtual on-screen key, the controller passes a predefined code to the target using the command pass-through mechanism (assuming the panel subunit identifier descriptor 932 indicates this option). It is appreciated that user events of the panel subunit architecture can also be used to perform step 968. At step 970, the target device constructs a bitmap image of the root panel display and selects a default focus selection. This bitmap is then sent to the controller which displays the root panel display at step 972, see FIG. 19B.

At step 974, if the user navigates through the bitmap selections, the target device will send the controller a new bitmap image reflecting the new focus selection, in the analogous way as described with respect to the EPG information transfer as shown in FIG. 17. At step 974, if the user selects one of the entries in the root panel display, the controller relays a code to the target that corresponds to the object identifier of the entry selected. In one embodiment, the command pass-through mechanism can be used to relay the code to the target. In another embodiment, a user event within the panel subunit architecture can be used to relay the code to the target. At step 976, the present invention analyzes the code and adjusts its behavior based on the selected entry. In one embodiment, the target device will commence performing the function corresponding to the selected entry. Process 960 is advantageous when used in conjunction with controllers that do not have the capability to render the root panel display on their own.

FIG. 23 illustrates a process similar to the process of FIG. 22 except the controller device generates the root panel display, not the target device. At steps 982–986 are analogous to steps 962–966 of FIG. 22. By the completion of step 986, the controller has read the root panel list from the target device. At step 988, in response to the user selecting a predefined key, e.g., the "control panel" key, the controller generates the root panel display on its own and presents the display on a screen. Although each entry in the root panel list specifies its own display attribute and panel type, the controller is still free to place the panel images in any order suitable within its display capabilities. Once the root panel list is read by the controller, it does not require any further communication with the target device to render the root panel display. Therefore, at step 988, the rendering of the root panel display by the controller is dependent only on user action that invokes such function and is not dependent on subsequent communication with the target device. This feature is advantageous because it provides a very fast panel display.

Because the controller performs its own rendering functions, it also maintains information as to the currently selected panel and maintains its own focus navigation and highlighting. Steps 990–992 are analogous to steps 974–976 of FIG. 22.

Therefore, the root panel list provides a mechanism that a controller can use to quickly identify, and present to a user, the functionally of a target device. It also provides, in certain circumstances, a software short cut for displaying the root panel information without requiring communication with the target (after the root panel list is initially read). In cases when the controller is not able to render on its own, the root panel list can be used in conjunction with the exact image transfer mechanism to provide a user selectable root panel display.

The preferred embodiment of the present invention, an exact image transfer mechanism and a root panel list mechanism for use with a panel subunit for remotely interfacing with a target device via an intelligent controller within a network of consumer electronic devices, is thus described. While the present invention has been described in particular embodiments, it should be appreciated that the present invention should not be construed as limited by such embodiments, but rather construed according to the below claims.

What is claimed is:

1. In a network of electronic devices, a method of controlling a target electronic device, said method comprising the steps of:
    a) said target generating a bitmap image containing objects and sending said bitmap image to a controller;
    b) said controller displaying said bitmap image without modifying the arrangement of said objects within said bitmap image and wherein at least one of said objects is a default focus;
    c) said controller sending said target a first command code;
    d) said target, in response to said first command code, altering said default focus to a first updated focus and generating a first updated bitmap image reflecting said first updated focus, said target sending said first updated bitmap image to said controller; and
    e) said controller displaying said first updated bitmap image without modifying the arrangement of objects within said first updated bitmap image.

2. A method as described in claim 1 wherein said bitmap images represent electronic programming guide information.

3. A method as described in claim 1 wherein said bitmap images represent control panel information.

4. A method as described in claim 1 wherein said step c) is performed using a user event signaling mechanism of a panel subunit.

5. A method as described in claim 1 wherein said step c) is performed using a command pass-through signaling mechanism within a panel subunit.

6. A method as described in claim 1 wherein said step c) comprises the steps of:
    c1) a user selecting a predefined key on a remote control device;
    c2) said controller recognizing said predefined key and based thereon selecting said first command code wherein said first command code corresponds to a focus navigation; and
    c3) said controller sending said target said first command code using a high speed bus.

7. A method as described in claim 1 further comprising the steps of:

f) said controller sending said target a second command code;

g) said target, in response to said second command code, altering said first updated focus to a second updated focus and generating a second updated bitmap image reflecting said second updated focus, said target sending said second updated bitmap image to said controller; and h) said controller displaying said second updated bitmap image without modifying the arrangement of objects within said second updated bitmap image.

8. A method as described in claim 2 wherein said controller is a television and wherein said target is a set-top-box.

9. An electronic network comprising:

a plurality of electronic devices coupled to a high speed bus and comprising a target and a controller;

wherein said target is operable to generate a bitmap image containing objects and also operable to send said bitmap image to a controller;

wherein said controller is operable to display said bitmap image without modifying the arrangement of said objects within said bitmap image and wherein at least one of said objects contains a default focus;

wherein said controller is operable to send said target a first command code;

wherein said target, in response to said first command code, is operable to alter said default focus to a first updated focus and operable to generate a first updated bitmap image reflecting said first updated focus, said target also operable to send said first updated bitmap image to said controller; and wherein said controller is operable to display said first updated bitmap image without modifying the arrangement of objects within said first updated bitmap image.

10. A network as described in claim 9 wherein said bitmap images represent electronic programming guide information.

11. A network as described in claim 9 wherein said bitmap images represent control panel information.

12. A network as described in claim 9 wherein said controller sends said target a first command code using a user event signaling mechanism of a panel subunit.

13. A network as described in claim 9 wherein said controller sends said target a first command code using a command pass-through signaling mechanism within a panel subunit.

14. A network as described in claim 9 further comprising a remote control device operable to communicate a user selection of a predefined key located thereon and wherein said controller is operable to recognize said predefined key and based thereon operable to select said first command code wherein said first command code corresponds to a focus navigation; and wherein further said controller is operable to send said target said first command code using said bus architecture.

15. A network as described in claim 9 wherein:

said controller is operable to send said target a second command code;

and wherein said target, in response to said second command code, is operable to alter said first updated focus to a second updated focus and operable to generate a second updated bitmap image reflecting said second updated focus, said target operable to send said second updated bitmap image to said controller; and wherein said controller is operable to display said second updated bitmap image without modifying the arrangement of objects within said second updated bitmap image.

16. A network as described in claim 10 wherein said controller is a television and wherein said target is a set-top-box.

* * * * *